US008775774B2

(12) United States Patent
Desai et al.

(10) Patent No.: US 8,775,774 B2
(45) Date of Patent: *Jul. 8, 2014

(54) MANAGEMENT SYSTEM AND METHODS FOR OBJECT STORAGE SYSTEM

(75) Inventors: Komal Desai, Fremont, CA (US); Satyam B. Vaghani, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/219,392

(22) Filed: Aug. 26, 2011

(65) Prior Publication Data

US 2013/0054890 A1 Feb. 28, 2013

(51) Int. Cl.
*G06F 12/02* (2006.01)

(52) U.S. Cl.
CPC ................. *G06F 12/0223* (2013.01)
USPC ........................................................ 711/203

(58) Field of Classification Search
CPC ................................................. G06F 12/0223
See application file for complete search history.

(56) References Cited

U.S. PATENT DOCUMENTS

| 7,131,027 | B2 | 10/2006 | Kodama et al. | |
|---|---|---|---|---|
| 7,558,926 | B1 | 7/2009 | Oliveira et al. | |
| 7,702,870 | B2 | 4/2010 | English et al. | |
| 7,769,722 | B1 | 8/2010 | Bergant et al. | |
| 7,827,201 | B1 | 11/2010 | Gordon et al. | |
| 2007/0198605 | A1 | 8/2007 | Saika | |
| 2008/0141041 | A1* | 6/2008 | Molaro et al. | 713/193 |
| 2009/0164780 | A1* | 6/2009 | Murayama et al. | 713/165 |
| 2009/0172039 | A1 | 7/2009 | Honami et al. | |
| 2009/0210875 | A1* | 8/2009 | Bolles et al. | 718/1 |
| 2009/0300283 | A1 | 12/2009 | Kudo | |
| 2010/0058021 | A1* | 3/2010 | Kawamura | 711/171 |
| 2010/0115222 | A1 | 5/2010 | Usami | |
| 2010/0153947 | A1 | 6/2010 | Haruma | |
| 2010/0185828 | A1 | 7/2010 | Kano | |
| 2011/0078398 | A1 | 3/2011 | Jess | |
| 2011/0161299 | A1 | 6/2011 | Prahlad et al. | |
| 2011/0208940 | A1* | 8/2011 | Naganuma et al. | 711/170 |
| 2012/0011315 | A1 | 1/2012 | Ishizaki et al. | |
| 2012/0110275 | A1* | 5/2012 | Ganti et al. | 711/153 |
| 2012/0254364 | A1* | 10/2012 | Vijayan | 709/219 |
| 2012/0317373 | A1* | 12/2012 | Ninose et al. | 711/154 |

FOREIGN PATENT DOCUMENTS

| WO | 0180013 A1 | 10/2001 |
|---|---|---|
| WO | 2010087803 A1 | 8/2010 |
| WO | 2011070605 A1 | 6/2011 |

OTHER PUBLICATIONS

International Search Report and Written Opinion dated Nov. 2, 2012 for PCT Application PCT/US2012/052039, 11 pages.

(Continued)

*Primary Examiner* — Hiep Nguyen

(57) ABSTRACT

The storage system exports logical storage volumes that are provisioned as storage objects. These storage objects are accessed on demand by connected computer systems using standard protocols, such as SCSI and NFS, through logical endpoints for the protocol traffic that are configured in the storage system. To facilitate creation and management of logical storage volumes, special application programming interfaces (APIs) have been developed. The special APIs include commands to create a logical storage volume, bind, unbind, and rebind the logical storage volume, extend the size of the logical storage volume, clone the logical storage volume, and move the logical storage volume.

20 Claims, 28 Drawing Sheets

(56) References Cited

OTHER PUBLICATIONS

International Search Report and Written Opinion dated Oct. 16, 2012 for PCT Application PCT/US2012/051840, 10 pages.
International Search Report and Written Opinion dated Nov. 2, 2012 for PCT Application PCT/US2012/051600, 9 pages.
International Search Report and Written Opinion dated Dec. 4, 2012 for PCT Application PCT/US2012/051872, 10 pages.

* cited by examiner

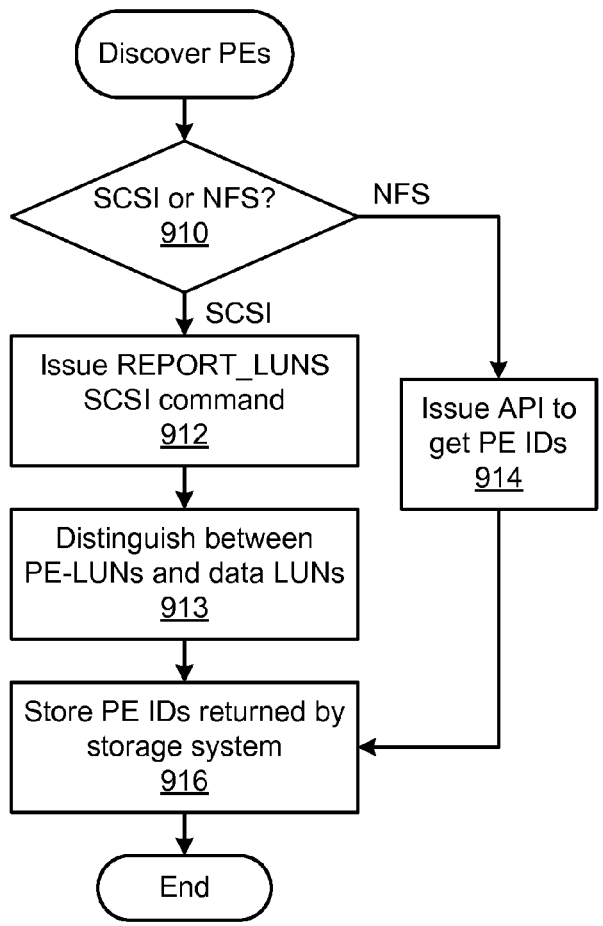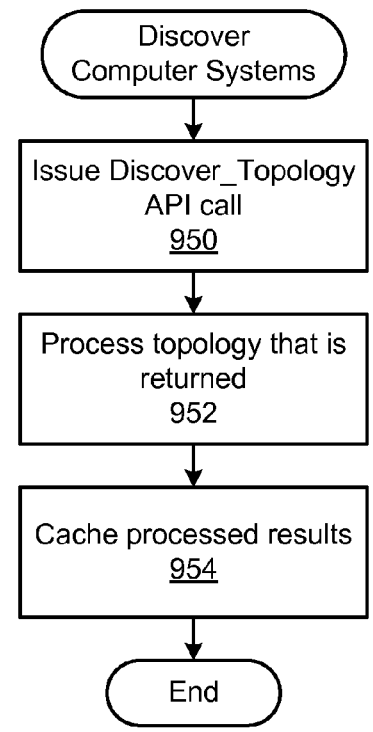
FIGURE 9A
FIGURE 9B

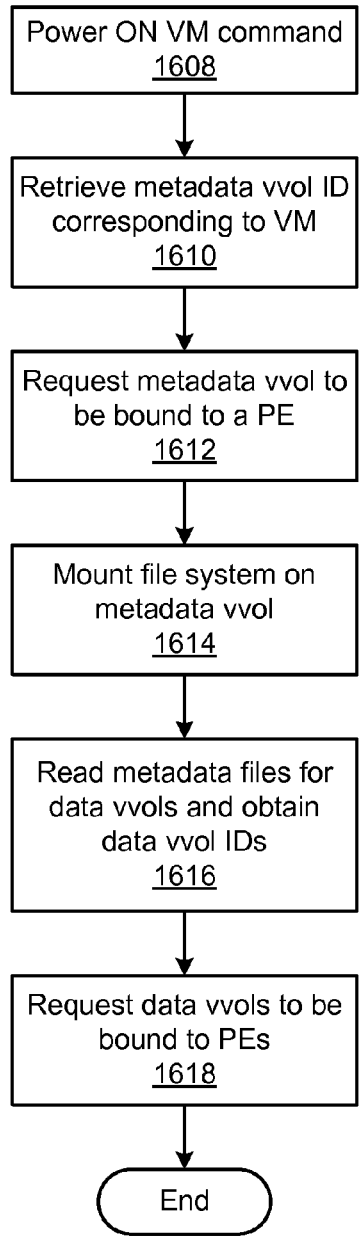
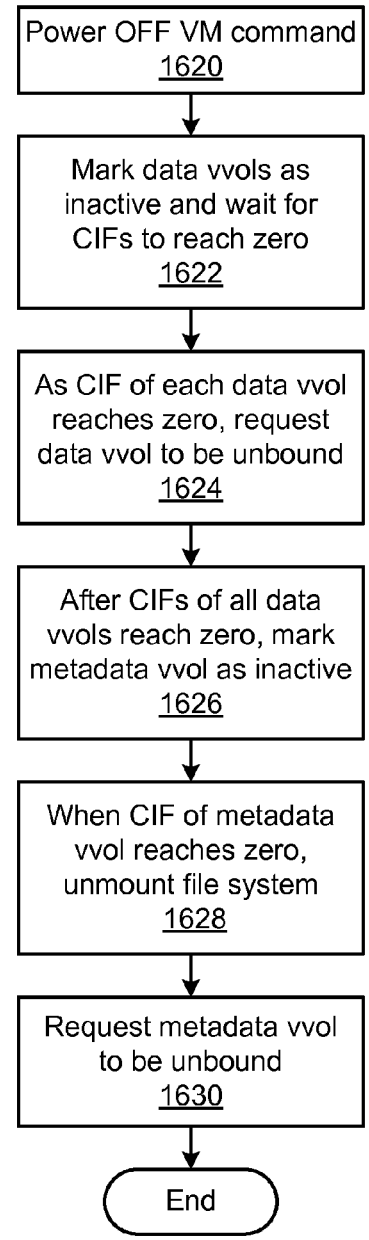
FIGURE 16A
FIGURE 16B

MANAGEMENT SYSTEM AND METHODS FOR OBJECT STORAGE SYSTEM

BACKGROUND

As computer systems scale to enterprise levels, particularly in the context of supporting large-scale data centers, the underlying data storage systems frequently employ a storage area network (SAN) or network attached storage (NAS). As is conventionally well appreciated, SAN or NAS provides a number of technical capabilities and operational benefits, fundamentally including virtualization of data storage devices, redundancy of physical devices with transparent fault-tolerant fail-over and fail-safe controls, geographically distributed and replicated storage, and centralized oversight and storage configuration management decoupled from client-centric computer systems management.

Architecturally, the storage devices in a SAN storage system (e.g., disk arrays, etc.) are typically connected to network switches (e.g., Fibre Channel switches, etc.) which are then connected to servers or "hosts" that require access to the data in the storage devices. The servers, switches and storage devices in a SAN typically communicate using the Small Computer System Interface (SCSI) protocol which transfers data across the network at the level of disk data blocks. In contrast, a NAS device is typically a device that internally contains one or more storage drives and that is connected to the hosts (or intermediating switches) through a network protocol such as Ethernet. In addition to containing storage devices, the NAS device has also pre-formatted its storage devices in accordance with a network-based file system, such as Network File System (NFS) or Common Internet File System (CIFS). As such, as opposed to a SAN which exposes disks (referred to as LUNs and further detailed below) to the hosts, which then need to be formatted and then mounted according to a file system utilized by the hosts, the NAS device's network-based file system (which needs to be supported by the operating system of the hosts) causes the NAS device to appear as a file server to the operating systems of hosts, which can then mount or map the NAS device, for example, as a network drive accessible by the operating system. It should be recognized that with the continuing innovation and release of new products by storage system vendors, clear distinctions between SAN and NAS storage systems continue to fade, with actual storage system implementations often exhibiting characteristics of both, offering both file-level protocols (NAS) and block-level protocols (SAN) in the same system. For example, in an alternative NAS architecture, a NAS "head" or "gateway" device is networked to the host rather than a traditional NAS device. Such a NAS gateway device does not itself contain storage drives, but enables external storage devices to be connected to the NAS gateway device (e.g., via a Fibre Channel interface, etc.). Such a NAS gateway device, which is perceived by the hosts in a similar fashion as a traditional NAS device, provides a capability to significantly increase the capacity of a NAS based storage architecture (e.g., at storage capacity levels more traditionally supported by SANs) while retaining the simplicity of file-level storage access.

SCSI and other block protocol-based storage devices, such as a storage system 30 shown in FIG. 1A, utilize a storage system manager 31, which represents one or more programmed storage processors, to aggregate the storage units or drives in the storage device and present them as one or more LUNs (Logical Unit Numbers) 34 each with a uniquely identifiable number. LUNs 34 are accessed by one or more computer systems 10 through a physical host bus adapter (HBA) 11 over a network 20 (e.g., Fiber Channel, etc.). Within computer system 10 and above HBA 11, storage access abstractions are characteristically implemented through a series of software layers, beginning with a low-level device driver layer 12 and ending in an operating system specific file system layers 15. Device driver layer 12, which enables basic access to LUNs 34, is typically specific to the communication protocol used by the storage system (e.g., SCSI, etc.). A data access layer 13 may be implemented above device driver layer 12 to support multipath consolidation of LUNs 34 visible through HBA 11 and other data access control and management functions. A logical volume manager 14, typically implemented between data access layer 13 and conventional operating system file system layers 15, supports volume-oriented virtualization and management of LUNs 34 that are accessible through HBA 11. Multiple LUNs 34 can be gathered and managed together as a volume under the control of logical volume manager 14 for presentation to and use by file system layers 15 as a logical device.

Storage system manager 31 implements a virtualization of physical, typically disk drive-based storage units, referred to in FIG. 1A as spindles 32, that reside in storage system 30. From a logical perspective, each of these spindles 32 can be thought of as a sequential array of fixed sized extents 33. Storage system manager 31 abstracts away complexities of targeting read and write operations to addresses of the actual spindles and extents of the disk drives by exposing to connected computer systems, such as computer systems 10, a contiguous logical storage space divided into a set of virtual SCSI devices, known as LUNs 34. Each LUN represents some capacity that is assigned for use by computer system 10 by virtue of existence of such LUN, and presentation of such LUN to computer systems 10. Storage system manager 31 maintains metadata that includes a mapping for each such LUN to an ordered list of extents, wherein each such extent can be identified as a spindle-extent pair <spindle #, extent #> and may therefore be located in any of the various spindles 32.

FIG. 1B is a block diagram of a conventional NAS or file-level based storage system 40 that is connected to one or more computer systems 10 via network interface cards (NIC) 11' over a network 21 (e.g., Ethernet). Storage system 40 includes a storage system manager 41, which represents one or more programmed storage processors. Storage system manager 41 implements a file system 45 on top of physical, typically disk drive-based storage units, referred to in FIG. 1B as spindles 42, that reside in storage system 40. From a logical perspective, each of these spindles can be thought of as a sequential array of fixed sized extents 43. File system 45 abstracts away complexities of targeting read and write operations to addresses of the actual spindles and extents of the disk drives by exposing to connected computer systems, such as computer systems 10, a namespace comprising directories and files that may be organized into file system level volumes 44 (hereinafter referred to as "FS volumes") that are accessed through their respective mount points.

Even with the advancements in storage systems described above, it has been widely recognized that they are not sufficiently scalable to meet the particular needs of virtualized computer systems. For example, a cluster of server machines may service as many as 10,000 virtual machines (VMs), each VM using a multiple number of "virtual disks" and a multiple number of "snapshots," each which may be stored, for example, as a file on a particular LUN or FS volume. Even at a scaled down estimation of 2 virtual disks and 2 snapshots per VM, this amounts to 60,000 distinct disks for the storage system to support if VMs were directly connected to physical disks (i.e., 1 virtual disk or snapshot per physical disk). In addition, storage device and topology management at this scale are known to be difficult. As a result, the concept of datastores in which VMs are multiplexed onto a smaller set of physical storage entities (e.g., LUN-based VMFS clustered file systems or FS volumes), such as described in U.S. Pat. No. 7,849,098, entitled "Providing Multiple Concurrent Access to a File System," incorporated by reference herein, was developed.

In conventional storage systems employing LUNs or FS volumes, workloads from multiple VMs are typically serviced by a single LUN or a single FS volume. As a result, resource demands from one VM workload will affect the service levels provided to another VM workload on the same LUN or FS volume. Efficiency measures for storage such as latency and input/output operations (IO) per second, or IOPS, thus vary depending on the number of workloads in a given LUN or FS volume and cannot be guaranteed. Consequently, storage policies for storage systems employing LUNs or FS volumes cannot be executed on a per-VM basis and service level agreement (SLA) guarantees cannot be given on a per-VM basis. In addition, data services provided by storage system vendors, such as snapshot, replication, encryption, and deduplication, are provided at a granularity of the LUNs or FS volumes, not at the granularity of a VM's virtual disk. As a result, snapshots can be created for the entire LUN or the entire FS volume using the data services provided by storage system vendors, but a snapshot for a single virtual disk of a VM cannot be created separately from the LUN or the file system in which the virtual disk is stored.

SUMMARY

One or more embodiments are directed to a storage system that is configured to isolate workloads running therein so that SLA guarantees can be provided per workload, and data services of the storage system can be provided per workload, without requiring a radical redesign of the storage system. In a storage system that stores virtual disks for multiple virtual machines, SLA guarantees can be provided on a per virtual disk basis and data services of the storage system can be provided on a per virtual disk basis.

According to embodiments of the invention, the storage system exports logical storage volumes, referred to herein as "virtual volumes," that are provisioned as storage objects on a per-workload basis, out of a logical storage capacity assignment, referred to herein as "storage containers." For a VM, a virtual volume may be created for each of the virtual disks and snapshots of the VM. In one embodiment, the virtual volumes are accessed on demand by connected computer systems using standard protocols, such as SCSI and NFS, through logical endpoints for the protocol traffic, known as "protocol endpoints," that are configured in the storage system.

A method for provisioning a logical storage volume for an application running in a computer system that is connected to a storage system via input-output command (IO) paths and non-IO paths, according to an embodiment of the present invention, includes the steps of selecting a logical storage container created in the storage system, issuing a request to the storage system via a non-IO path to create the logical storage volume in the selected logical storage container, and storing a unique identifier for the logical storage volume received from the storage system in response to the request and associating the unique identifier with the application running in the computer system.

A method for reprovisioning a logical storage volume for an application running in a computer system that is connected to a storage system via IO paths and non-IO paths, according to an embodiment of the present invention, includes the steps of issuing a request to the storage system via a non-IO path to increase a size of the logical storage volume provisioned in the selected logical storage container, receiving acknowledgement of the increase in size from the storage system, and updating a metadata file associated with the logical storage volume to indicate the increased size.

In accordance with another embodiment of the invention, a computer system connected to a storage system via IO paths and non-IO paths, includes a management interface in a non-IO path, and a storage interface in an IO path. The management interface is configured to: (i) generate a request to create a logical storage volume in the storage system and to receive in response to the request a unique identifier for the logical storage volume, and (ii) generate a request to bind the logical storage volume to a protocol endpoint configured in the storage system and to receive in response to the request first and second identifiers, and the storage interface encodes IO issued to the logical storage volume with the first and second identifiers.

Embodiments of the present invention further include a non-transitory computer-readable storage medium storing instructions that when executed by a computer system cause the computer system to perform one of the methods set forth above.

BRIEF DESCRIPTION OF THE DRAWINGS

FIG. 9A is a flow diagram of method steps for discovering protocol endpoints that are available to a computer system.

FIG. 9B is a flow diagram of method steps for the storage system to discover protocol endpoints to which a computer system is connected via an in-band path.

FIG. 16A is a flow diagram of method steps for powering ON a VM.

FIG. 16B is a flow diagram of method steps for powering OFF a VM.

DETAILED DESCRIPTION

Figure 1A:
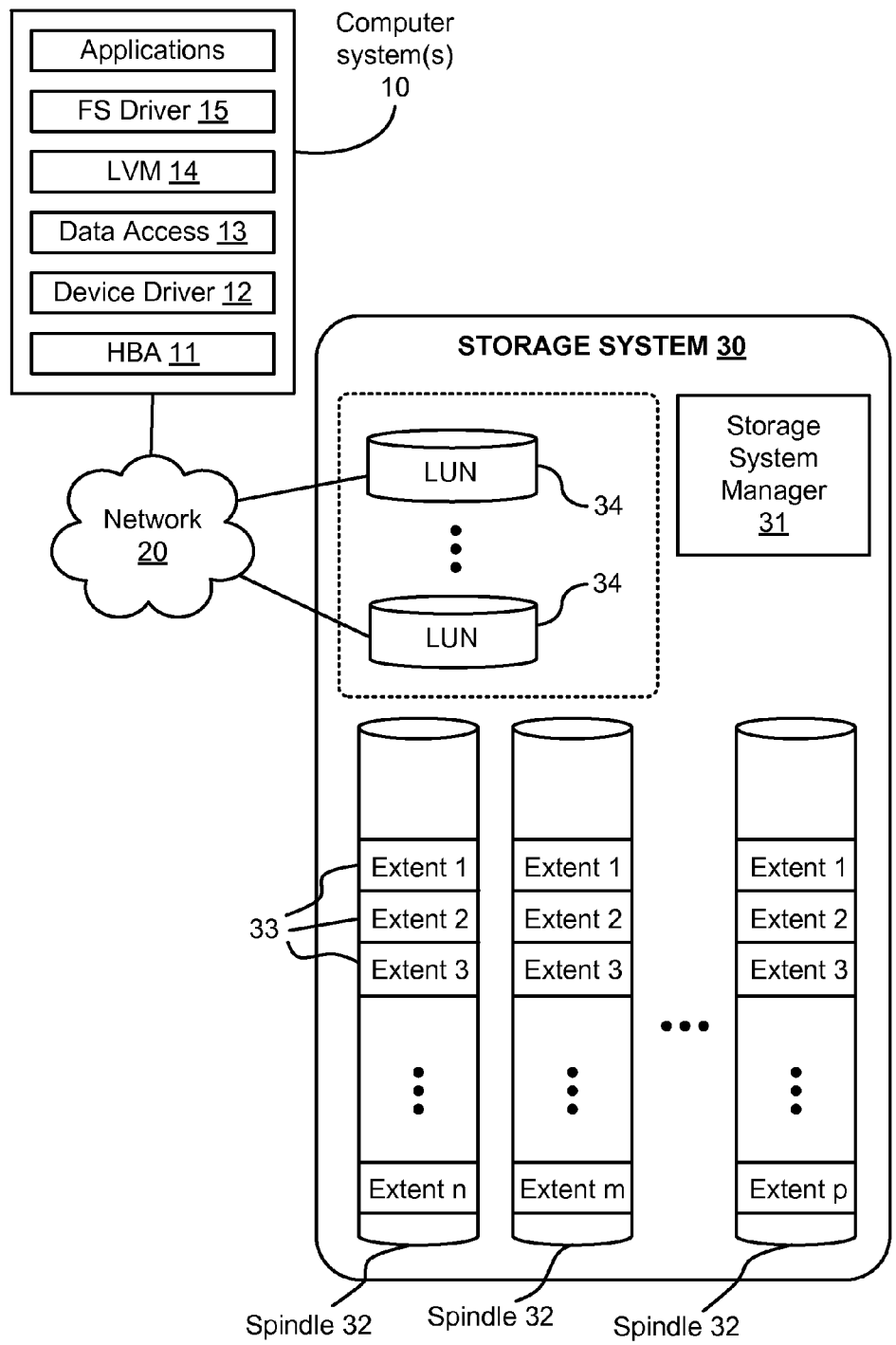
FIG. 1A is a block diagram of a conventional block protocol-based storage device that is connected to one or more computer systems over a network.
Figure 1B:
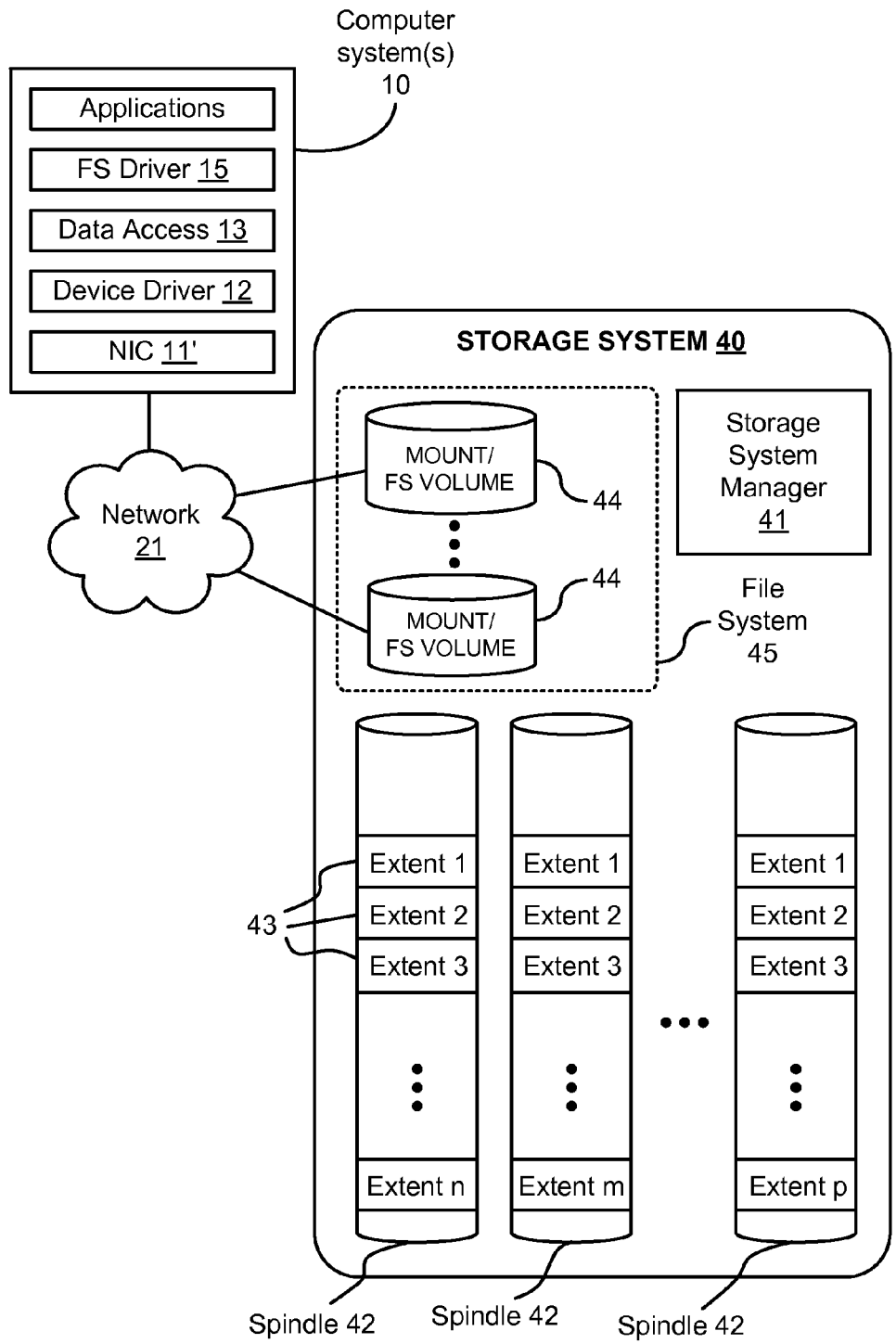
FIG. 1B is a block diagram of a conventional NAS device that is connected to one or more computer systems over a network.
Figure 2A:
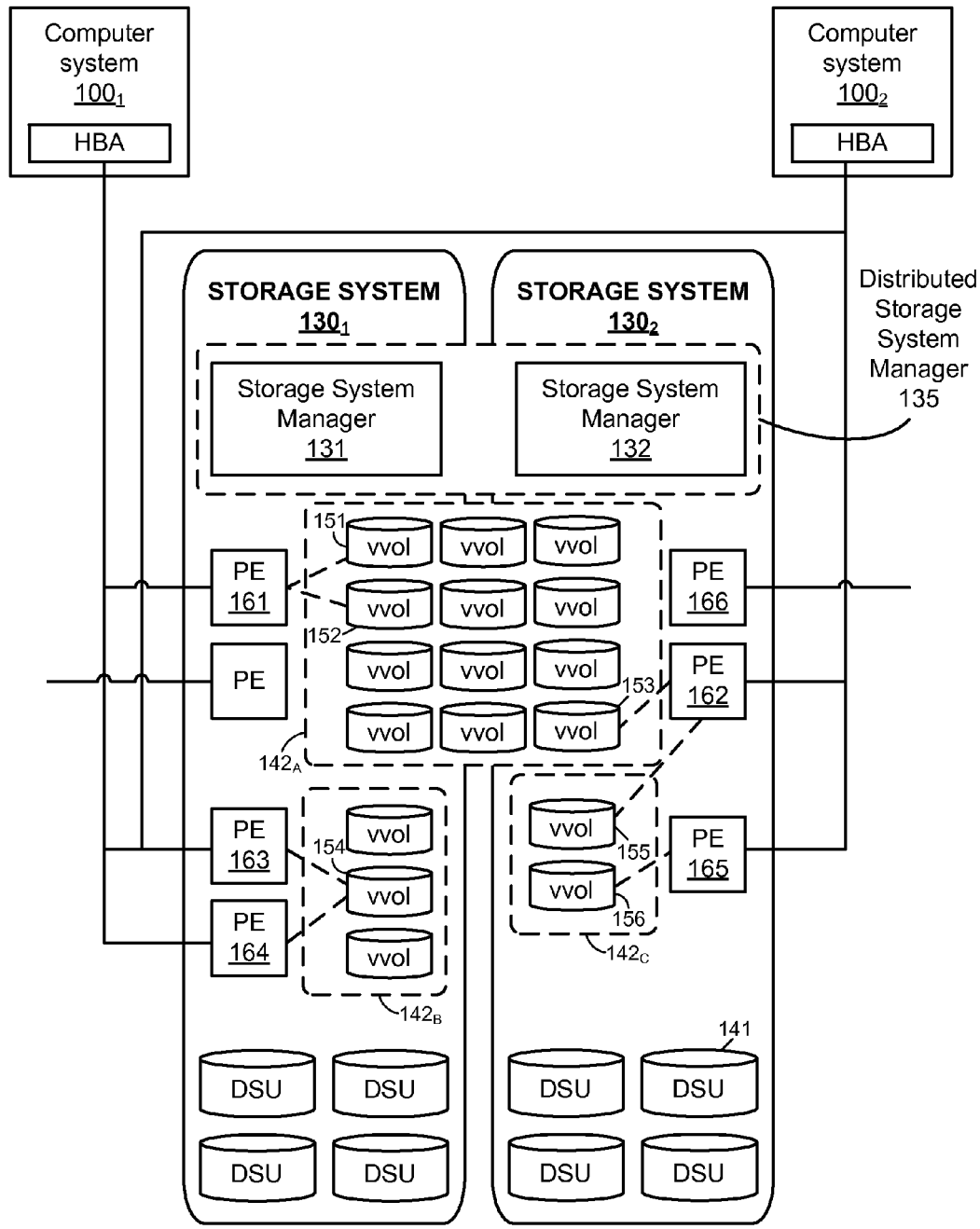
FIG. 2A is a block diagram of a block protocol-based storage system cluster that implements virtual volumes according to an embodiment of the invention.
Figure 2B:
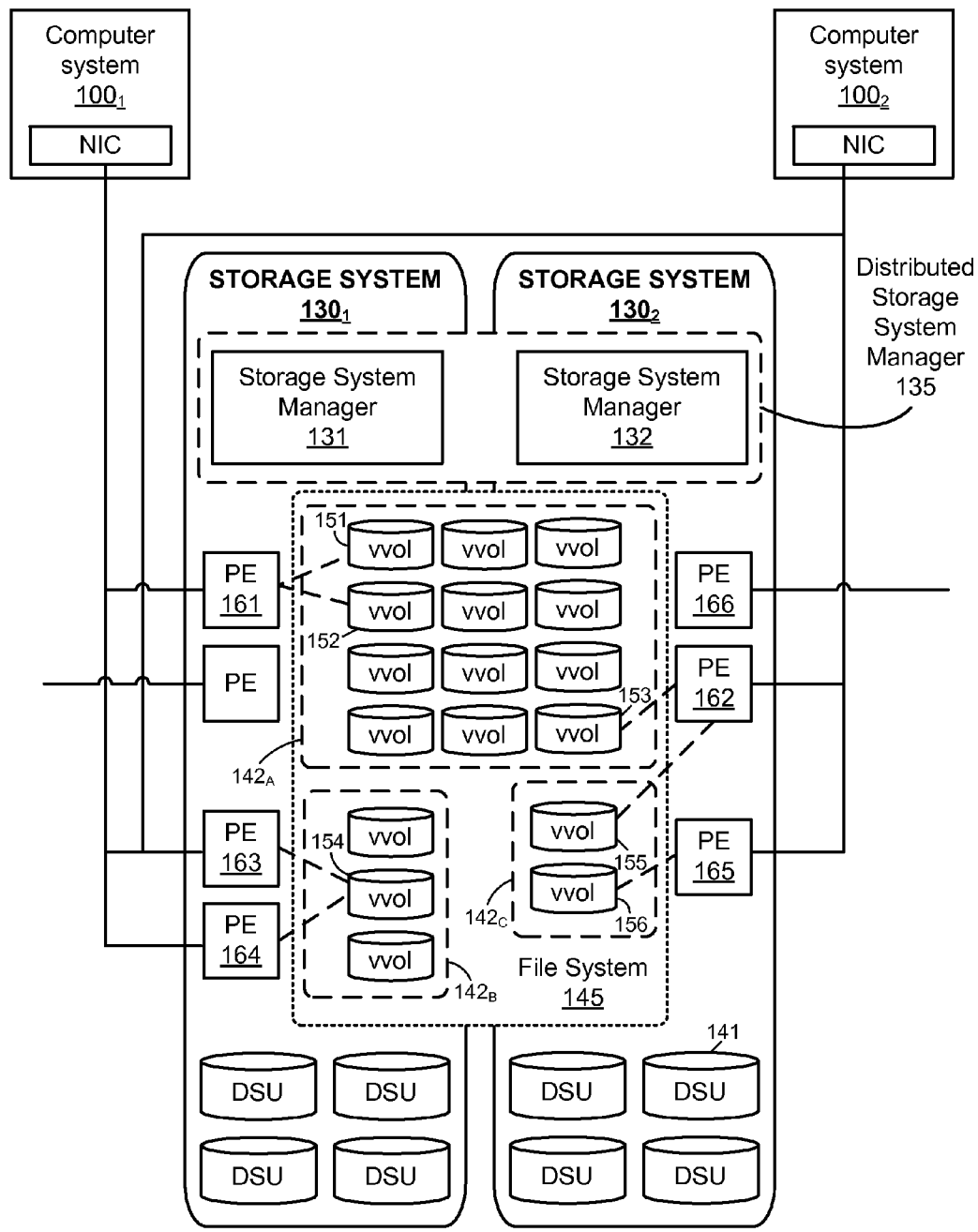
FIG. 2B is a block diagram of a NAS based storage system cluster that implements virtual volumes according to an embodiment of the invention.
Figure 6:
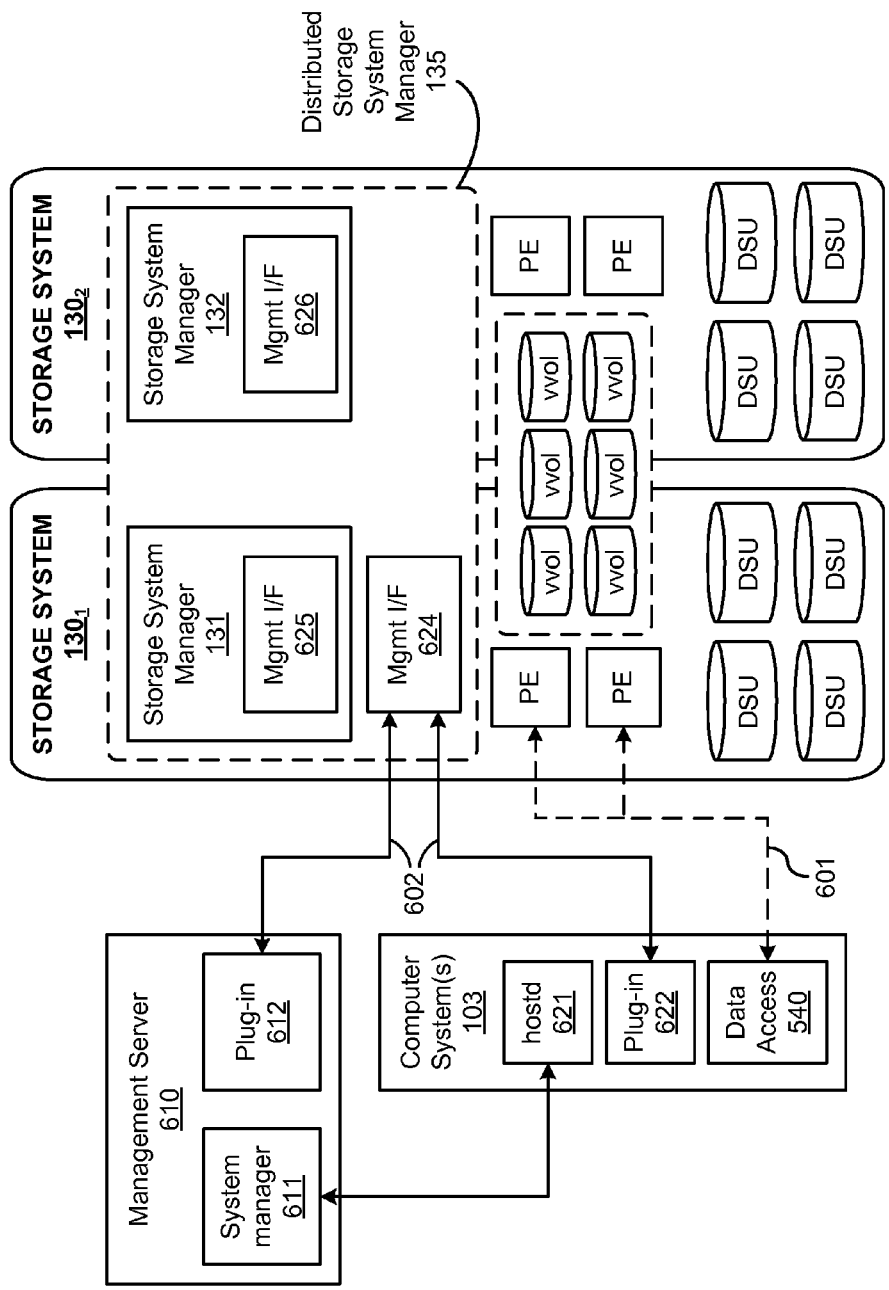
FIG. 6 is a simplified block diagram of a computer environment that illustrates components and communication paths used to manage virtual volumes according to an embodiment of the invention.

FIGS. 2A and 2B are block diagrams of a storage system cluster that implements "virtual volumes" according to embodiments of the invention. The storage system cluster includes one or more storage systems, e.g., storage systems $130_1$ and $130_2$, which may be disk arrays, each having a plurality of data storage units (DSUs), one of which is labeled as 141 in the figures, and storage system managers 131 and 132 that control various operations of storage systems 130 to enable embodiments of the invention described herein. In one embodiment, two or more storage systems 130 may implement a distributed storage system manager 135 that controls the operations of the storage system cluster as if they were a single logical storage system. The operational domain of distributed storage system manager 135 may span storage systems installed in the same data center or across multiple data centers. For example, in one such embodiment, distributed storage system manager 135 may comprise storage system manager 131, which serves as a "master" manager when communicating with storage system manager 132, which serves as a "slave" manager, although it should be recognized that a variety of alternative methods to implement a distributed storage system manager may be implemented. DSUs represent physical storage units, e.g., disk or flash based storage units such as rotating disks or solid state disks. According to embodiments, the storage system cluster creates and exposes "virtual volumes" (vvols), as further detailed herein, to connected computer systems, such as computer systems $100_1$ and $100_2$. Applications (e.g., VMs accessing their virtual disks, etc.) running in computer systems 100 access the vvols on demand using standard protocols, such as SCSI in the embodiment of FIG. 2A and NFS in the embodiment of FIG. 2B, through logical endpoints for the SCSI or NFS protocol traffic, known as "protocol endpoints" (PEs), that are configured in storage systems 130. The communication path for application-related data operations from computer systems 100 to the storage systems 130 is referred to herein as an "in-band" path. Communication paths between host bus adapters (HBAs) of computer systems 100 and PEs configured in storage systems 130 and between network interface cards (NICs) of computer systems 100 and PEs configured in storage systems 130 are examples of in-band paths. Communication paths from computer systems 100 to storage systems 130 that are not in-band, and that are typically used to carry out management operations, are referred to herein as an "out-of-band" path. Examples of out-of-band paths, such as an Ethernet network connection between computer systems 100 and storage systems 130, are illustrated in FIG. 6 separately from the in-band paths. For simplicity, computer systems 100 are shown to be directly connected to storage systems 130. However, it should be understood that they may be connected to storage systems 130 through multiple paths and one or more of switches.

Distributed storage system manager 135 or a single storage system manager 131 or 132 may create vvols (e.g., upon request of a computer system 100, etc.) from logical "storage containers," which represent a logical aggregation of physical DSUs. In general, a storage container may span more than one storage system and many storage containers may be created by a single storage system manager or a distributed storage system manager. Similarly, a single storage system may contain many storage containers. In FIGS. 2A and 2B, storage container $142_A$ created by distributed storage system manager 135 is shown as spanning storage system $130_1$ and storage system $130_2$, whereas storage container $142_B$ and storage container $142_C$ are shown as being contained within a single storage system (i.e., storage system $130_1$ and storage system $130_2$, respectively). It should be recognized that, because a storage container can span more than one storage system, a storage system administrator can provision to its customers a storage capacity that exceeds the storage capacity of any one storage system. It should be further recognized that, because multiple storage containers can be created within a single storage system, the storage system administrator can provision storage to multiple customers using a single storage system.

In the embodiment of FIG. 2A, each vvol is provisioned from a block based storage system. In the embodiment of FIG. 2B, a NAS based storage system implements a file system 145 on top of DSUs 141 and each vvol is exposed to computer systems 100 as a file object within this file system. In addition, as will be described in further detail below, applications running on computer systems 100 access vvols for IO through PEs. For example, as illustrated in dashed lines in FIGS. 2A and 2B, vvol 151 and vvol 152 are accessible via PE 161; vvol 153 and vvol 155 are accessible via PE 162; vvol 154 is accessible via PE 163 and PE 164; and vvol 156 is accessible via PE 165. It should be recognized that vvols from multiple storage containers, such as vvol 153 in storage container $142_A$ and vvol 155 in storage container 142, may be accessible via a single PE, such as PE 162, at any given time.

It should further be recognized that PEs, such as PE 166, may exist in the absence of any vvols that are accessible via them.

In the embodiment of FIG. 2A, storage systems 130 implement PEs as a special type of LUN using known methods for setting up LUNs. As with LUNs, a storage system 130 provides each PE a unique identifier known as a WWN (World Wide Name). In one embodiment, when creating the PEs, storage system 130 does not specify a size for the special LUN because the PEs described herein are not actual data containers. In one such embodiment, storage system 130 may assign a zero value or a very small value as the size of a PE-related LUN such that administrators can quickly identify PEs when requesting that a storage system provide a list of LUNs (e.g., traditional data LUNs and PE-related LUNs), as further discussed below. Similarly, storage system 130 may assign a LUN number greater than 255 as the identifying number for the LUN to the PEs to indicate, in a human-friendly way, that they are not data LUNs. As another way to distinguish between the PEs and LUNs, a PE bit may be added to the Extended Inquiry Data VPD page (page 86h). The PE bit is set to 1 when a LUN is a PE, and to 0 when it is a regular data LUN. Computer systems 100 may discover the PEs via the in-band path by issuing a SCSI command REPORT_LUNS and determine whether they are PEs according to embodiments described herein or conventional data LUNs by examining the indicated PE bit. Computer systems 100 may optionally inspect the LUN size and LUN number properties to further confirm whether the LUN is a PE or a conventional LUN. It should be recognized that any one of the techniques described above may be used to distinguish a PE-related LUN from a regular data LUN. In one embodiment, the PE bit technique is the only technique that is used to distinguish a PE-related LUN from a regular data LUN.

In the embodiment of FIG. 2B, the PEs are created in storage systems 130 using known methods for setting up mount points to FS volumes. Each PE that is created in the embodiment of FIG. 2B is identified uniquely by an IP address and file system path, also conventionally referred together as a "mount point." However, unlike conventional mount points, the PEs are not associated with FS volumes. In addition, unlike the PEs of FIG. 2A, the PEs of FIG. 2B are not discoverable by computer systems 100 via the in-band path unless virtual volumes are bound to a given PE. Therefore, the PEs of FIG. 2B are reported by the storage system via the out-of-band path.

Figure 3:
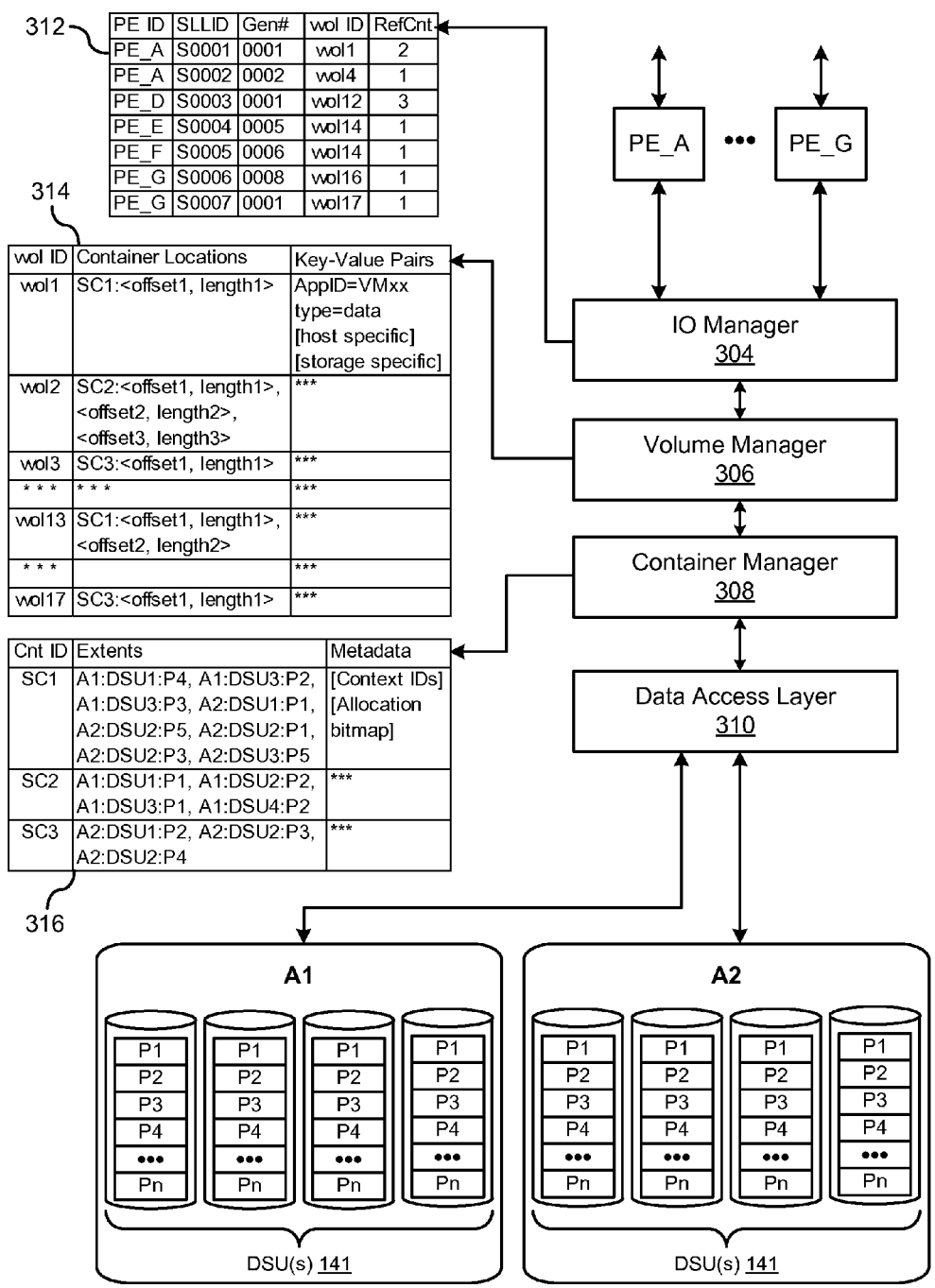
FIG. 3 is a block diagram of components of the storage system cluster of FIG. 2A or 2B for managing virtual volumes according to an embodiment of the invention.

FIG. 3 is a block diagram of components of the storage system cluster of FIG. 2A or 2B for managing virtual volumes according to an embodiment. The components include software modules of storage system managers 131 and 132 executing in storage systems 130 in one embodiment or software modules of distributed storage system manager 135 in another embodiment, namely an input/output (I/O) manager 304, a volume manager 306, a container manager 308, and a data access layer 310. In the descriptions of the embodiments herein, it should be understood that any actions taken by distributed storage system manager 135 may be taken by storage system manager 131 or storage system manager 132 depending on the embodiment.

In the example of FIG. 3, distributed storage system manager 135 has created three storage containers SC1, SC2, and SC3 from DSUs 141, each of which is shown to have spindle extents labeled P1 through Pn. In general, each storage container has a fixed physical size, and is associated with specific extents of DSUs. In the example shown in FIG. 3, distributed storage system manager 135 has access to a container database 316 that stores for each storage container, its container ID, physical layout information and some metadata. Container database 316 is managed and updated by a container manager 308, which in one embodiment is a component of distributed storage system manager 135. The container ID is a universally unique identifier that is given to the storage container when the storage container is created. Physical layout information consists of the spindle extents of DSUs 141 that are associated with the given storage container and stored as an ordered list of <system ID, DSU ID, extent number>. The metadata section may contain some common and some storage system vendor specific metadata. For example, the metadata section may contain the IDs of computer systems or applications or users that are permitted to access the storage container. As another example, the metadata section contains an allocation bitmap to denote which <system ID, DSU ID, extent number> extents of the storage container are already allocated to existing vvols and which ones are free. In one embodiment, a storage system administrator may create separate storage containers for different business units so that vvols of different business units are not provisioned from the same storage container. Other policies for segregating vvols may be applied. For example, a storage system administrator may adopt a policy that vvols of different customers of a cloud service are to be provisioned from different storage containers. Also, vvols may be grouped and provisioned from storage containers according to their required service levels. In addition, a storage system administrator may create, delete, and otherwise manage storage containers, such as defining the number of storage containers that can be created and setting the maximum physical size that can be set per storage container.

Also, in the example of FIG. 3, distributed storage system manager 135 has provisioned (on behalf of requesting computer systems 100) multiple vvols, each from a different storage container. In general, vvols may have a fixed physical size or may be thinly provisioned, and each vvol has a vvol ID, which is a universally unique identifier that is given to the vvol when the vvol is created. For each vvol, a vvol database 314 stores for each vvol, its vvol ID, the container ID of the storage container in which the vvol is created, and an ordered list of <offset, length> values within that storage container that comprise the address space of the vvol. Vvol database 314 is managed and updated by volume manager 306, which in one embodiment, is a component of distributed storage system manager 135. In one embodiment, vvol database 314 also stores a small amount of metadata about the vvol. This metadata is stored in vvol database 314 as a set of key-value pairs, and may be updated and queried by computer systems 100 via the out-of-band path at any time during the vvol's existence. Stored key-value pairs fall into three categories. The first category is: well-known keys—the definition of certain keys (and hence the interpretation of their values) are publicly available. One example is a key that corresponds to the virtual volume type (e.g., in virtual machine embodiments, whether the vvol contains a VM's metadata or a VM's data). Another example is the App ID, which is the ID of the application that stored data in the vvol. The second category is: computer system specific keys—the computer system or its management module stores certain keys and values as the virtual volume's metadata. The third category is: storage system vendor specific keys—these allow the storage system vendor to store certain keys associated with the virtual volume's metadata. One reason for a storage system vendor to use this key-value store for its metadata is that all of these keys are readily available to storage system vendor plug-ins and other extensions via the out-of-band channel for vvols. The store operations for key-value pairs are part of virtual volume creation and other processes, and thus the store operation should be reasonably fast. Storage systems are also configured to enable searches of virtual volumes based on exact matches to values provided on specific keys.

IO manager 304 is a software module (also, in certain embodiments, a component of distributed storage system manager 135) that maintains a connection database 312 that stores currently valid IO connection paths between PEs and vvols. In the example shown in FIG. 3, seven currently valid IO sessions are shown. Each valid session has an associated PE ID, secondary level identifier (SLLID), vvol ID, and reference count (RefCnt) indicating the number of different applications that are performing IO through this IO session. The process of establishing a valid IO session between a PE and a vvol by distributed storage system manager 135 (e.g., on request by a computer system 100) is referred to herein as a "bind" process. For each bind, distributed storage system manager 135 (e.g., via IO manager 304) adds an entry to connection database 312. The process of subsequently tearing down the IO session by distributed storage system manager 135 is referred to herein as an "unbind" process. For each unbind, distributed storage system manager 135 (e.g., via IO manager 304) decrements the reference count of the IO session by one. When the reference count of an IO session is at zero, distributed storage system manager 135 (e.g., via IO manager 304) may delete the entry for that IO connection path from connection database 312. As previously discussed, in one embodiment, computer systems 100 generate and transmit bind and unbind requests via the out-of-band path to distributed storage system manager 135. Alternatively, computer systems 100 may generate and transmit unbind requests via an in-band path by overloading existing error paths. In one embodiment, the generation number is changed to a monotonically increasing number or a randomly generated number, when the reference count changes from 0 to 1 or vice versa. In another embodiment, the generation number is a randomly generated number and the RefCnt column is eliminated from connection database 312, and for each bind, even when the bind request is to a vvol that is already bound, distributed storage system manager 135 (e.g., via IO manager 304) adds an entry to connection database 312.

In the storage system cluster of FIG. 2A, IO manager 304 processes IO requests (IOs) from computer systems 100 received through the PEs using connection database 312. When an IO is received at one of the PEs, IO manager 304 parses the IO to identify the PE ID and the SLLID contained in the IO in order to determine a vvol for which the IO was intended. By accessing connection database 314, IO manager 304 is then able to retrieve the vvol ID associated with the parsed PE ID and SLLID. In FIG. 3 and subsequent figures, PE ID is shown as PE_A, PE_B, etc. for simplicity. In one embodiment, the actual PE IDs are the WWNs of the PEs. In addition, SLLID is shown as S0001, S0002, etc. The actual SLLIDs are generated by distributed storage system manager 135 as any unique number among SLLIDs associated with a given PE ID in connection database 312. The mapping between the logical address space of the virtual volume having the vvol ID and the physical locations of DSUs 141 is carried out by volume manager 306 using vvol database 314 and by container manager 308 using container database 316. Once the physical locations of DSUs 141 have been obtained, data access layer 310 (in one embodiment, also a component of distributed storage system manager 135) performs IO on these physical locations.

In the storage system cluster of FIG. 2B, IOs are received through the PEs and each such IO includes an NFS handle (or similar file system handle) to which the IO has been issued. In one embodiment, connection database 312 for such a system contains the IP address of the NFS interface of the storage system as the PE ID and the file system path as the SLLID. The SLLIDs are generated based on the location of the vvol in the file system 145. The mapping between the logical address space of the vvol and the physical locations of DSUs 141 is carried out by volume manager 306 using vvol database 314 and by container manager 308 using container database 316. Once the physical locations of DSUs 141 have been obtained, data access layer performs IO on these physical locations. It should be recognized that for a storage system of FIG. 2B, container database 312 may contain an ordered list of file:<offset, length> entries in the Container Locations entry for a given vvol (i.e., a vvol can be comprised of multiple file segments that are stored in the file system 145).

In one embodiment, connection database 312 is maintained in volatile memory while vvol database 314 and container database 316 are maintained in persistent storage, such as DSUs 141. In other embodiments, all of the databases 312, 314, 316 may be maintained in persistent storage.

Figure 4:
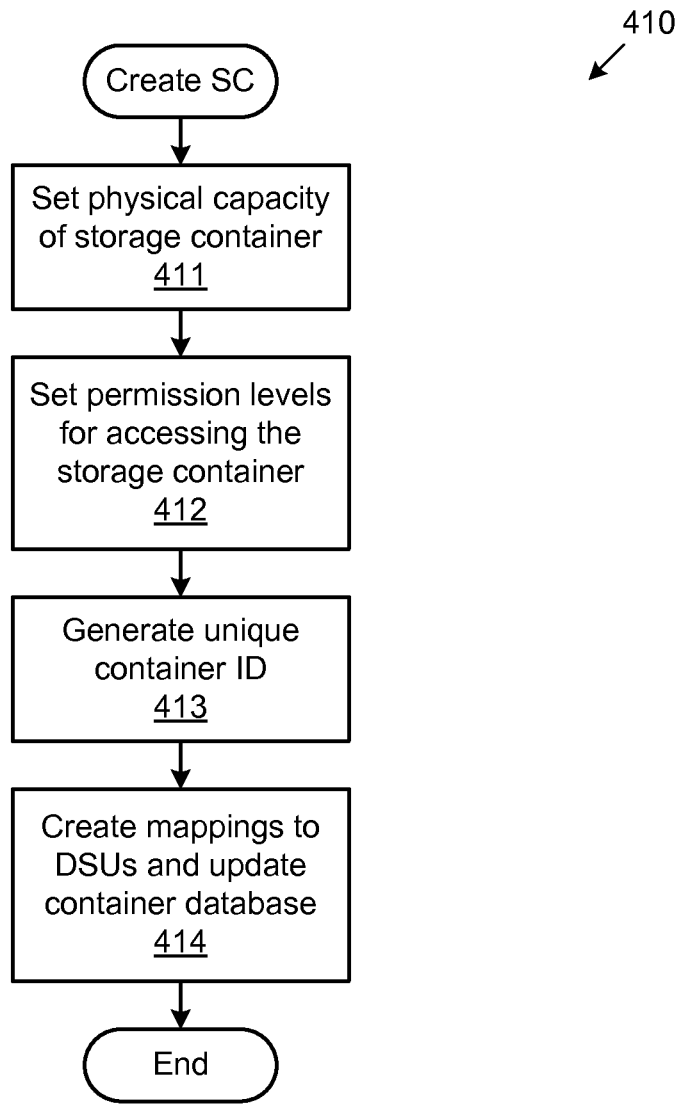
FIG. 4 is a flow diagram of method steps for creating a storage container.

FIG. 4 is a flow diagram of method steps 410 for creating a storage container. In one embodiment, these steps are carried out by storage system manager 131, storage system manager 132 or distributed storage system manager 135 under control of a storage administrator. As noted above, a storage container represents a logical aggregation of physical DSUs and may span physical DSUs from more than one storage system. At step 411, the storage administrator (via distributed storage system manager 135, etc.) sets a physical capacity of a storage container. Within a cloud or data center, this physical capacity may, for example, represent the amount of physical storage that is leased by a customer. The flexibility provided by storage containers disclosed herein is that storage containers of different customers can be provisioned by a storage administrator from the same storage system and a storage container for a single customer can be provisioned from multiple storage systems, e.g., in cases where the physical capacity of any one storage device is not sufficient to meet the size requested by the customer, or in cases such as replication where the physical storage footprint of a vvol will naturally span multiple storage systems. At step 412, the storage administrator sets permission levels for accessing the storage container. In a multi-tenant data center, for example, a customer may only access the storage container that has been leased to him or her. At step 413, distributed storage system manager 135 generates a unique identifier for the storage container. Then, at step 414, distributed storage system manager 135 (e.g., via container manager 308 in one embodiment) allocates free spindle extents of DSUs 141 to the storage container in sufficient quantities to meet the physical capacity set at step 411. As noted above, in cases where the free space of any one storage system is not sufficient to meet the physical capacity, distributed storage system manager 135 may allocate spindle extents of DSUs 141 from multiple storage systems. After the partitions have been allocated, distributed storage system manager 135 (e.g., via container manager 308) updates container database 316 with the unique container ID, an ordered list of <system number, DSU ID, extent number>, and context IDs of computer systems that are permitted to access the storage container.

According to embodiments described herein, storage capability profiles, e.g., SLAs or quality of service (QoS), may be configured by distributed storage system manager 135 (e.g., on behalf of requesting computer systems 100) on a per vvol basis. Therefore, it is possible for vvols with different storage capability profiles to be part of the same storage container. In one embodiment, a system administrator defines a default storage capability profile (or a number of possible storage capability profiles) for newly created vvols at the time of creation of the storage container and stored in the metadata section of container database 316. If a storage capability profile is not explicitly specified for a new vvol being created inside a storage container, the new vvol will inherit the default storage capability profile associated with the storage container.

Figure 5A:
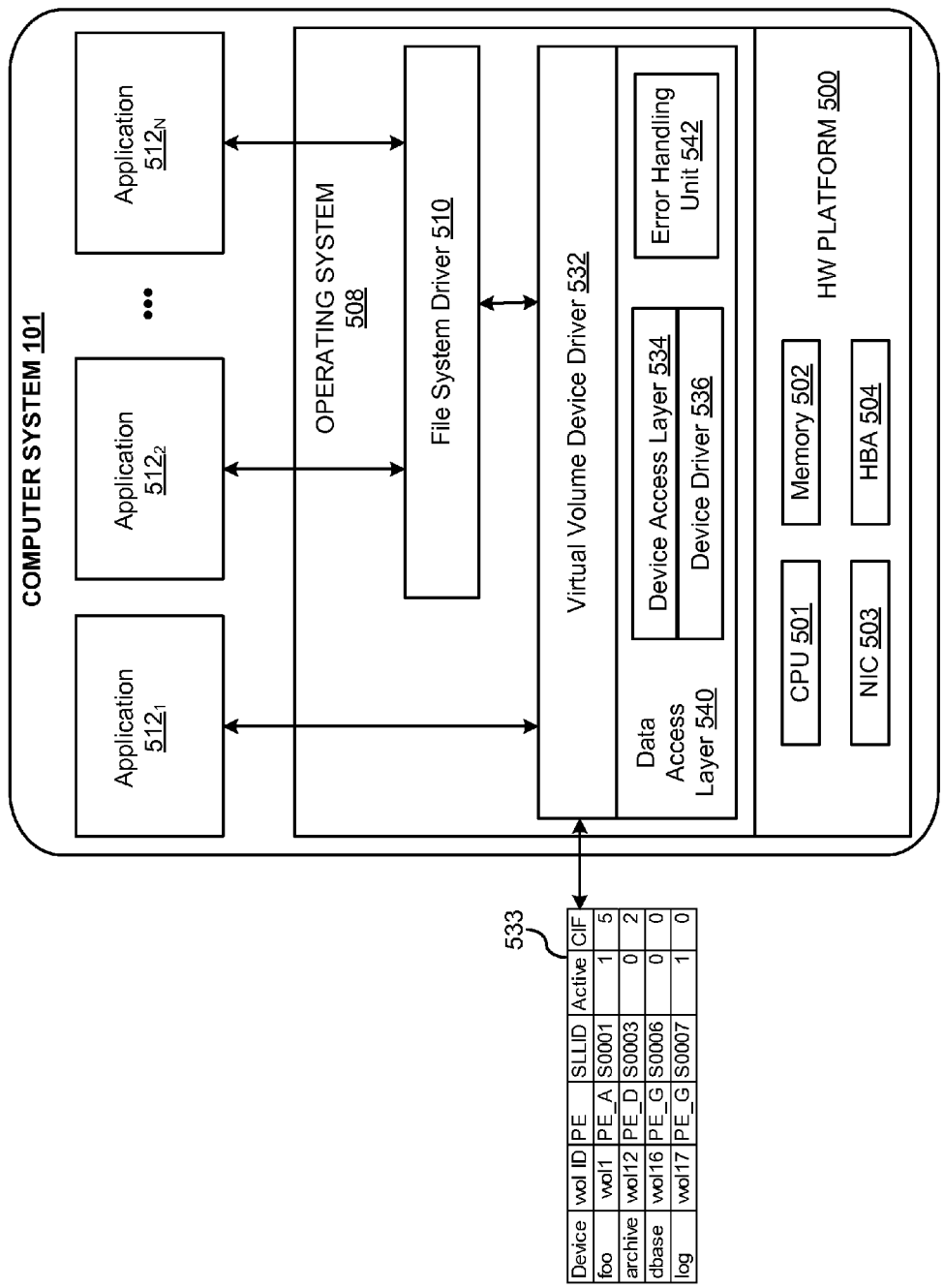
FIG. 5A is a block diagram of an embodiment of a computer system configured to implement virtual volumes hosted on a SAN-based storage system.

FIG. 5A is a block diagram of an embodiment of a computer system configured to implement virtual volumes hosted on a storage system cluster of FIG. 2A. Computer system 101 may be constructed on a conventional, typically server-class, hardware platform 500 that includes one or more central processing units (CPU) 501, memory 502, one or more network interface cards (NIC) 503, and one or more host bus adapters (HBA) 504. HBA 504 enables computer system 101 to issue IOs to virtual volumes through PEs configured in storage devices 130. As further shown in FIG. 5A, operating system 508 is installed on top of hardware platform 500 and a number of applications $512_1$-$512_N$ are executed on top of operating system 508. Examples of operating system 508 include any of the well-known commodity operating systems, such as Microsoft Windows, Linux, and the like.

According to embodiments described herein, each application 512 has one or more vvols associated therewith and issues IOs to block device instances of the vvols created by operating system 508 pursuant to "CREATE DEVICE" calls by application 512 into operating system 508. The association between block device names and vvol IDs are maintained in block device database 533. IOs from applications $512_2$-$512_N$ are received by a file system driver 510, which converts them to block IOs, and provides the block IOs to a virtual volume device driver 532. IOs from application $512_1$, on the other hand, are shown to bypass file system driver 510 and provided directly to virtual volume device driver 532, signifying that application $512_1$ accesses its block device directly as a raw storage device, e.g., as a database disk, a log disk, a backup archive, and a content repository, in the manner described in U.S. Pat. No. 7,155,558 entitled "Providing Access to a Raw Data Storage Unit in a Computer System," the entire contents of which are incorporated by reference herein. When virtual volume device driver 532 receives a block IO, it accesses block device database 533 to reference a mapping between the block device name specified in the IO and the PE ID (WWN of PE LUN) and SLLID that define the IO connection path to the vvol associated with the block device name. In the example shown herein, the block device name, archive, corresponds to a block device instance of vvol12 that was created for application $512_1$, and the block device names, foo, dbase, and log, correspond to block device instances of vvol1, vvol16, and vvol17, respectively, that were created for one or more of applications $512_2$-$512_N$. Other information that is stored in block device database 533 includes an active bit value for each block device that indicates whether or not the block device is active, and a CIF (commands-in-flight) value. An active bit of "1" signifies that IOs can be issued to the block device. An active bit of "0" signifies that the block device is inactive and IOs cannot be issued to the block device. The CIF value provides an indication of how many IOs are in flight, i.e., issued but not completed. In the example shown herein, the block device, foo, is active, and has some commands-in-flight. The block device, archive, is inactive, and will not accept newer commands. However, it is waiting for 2 commands-in-flight to complete. The block device, dbase, is inactive with no outstanding commands. Finally, the block device, log, is active, but the application currently has no pending IOs to the device. Virtual volume device driver 532 may choose to remove such devices from its database 533 at any time.

In addition to performing the mapping described above, virtual volume device driver 532 issues raw block-level IOs to data access layer 540. Data access layer 540 includes device access layer 534, which applies command queuing and scheduling policies to the raw block-level IOs, and device driver 536 for HBA 504 which formats the raw block-level IOs in a protocol-compliant format and sends them to HBA 504 for forwarding to the PEs via an in-band path. In the embodiment where SCSI protocol is used, the vvol information is encoded in the SCSI LUN data field, which is an 8-byte structure, as specified in SAM-5 (SCSI Architecture Model-5). The PE ID is encoded in the first 2 bytes, which is conventionally used for the LUN ID, and the vvol information, in particular the SLLID, is encoded in the SCSI second level LUN ID, utilizing (a portion of) the remaining 6 bytes.

As further shown in FIG. 5A, data access layer 540 also includes an error handling unit 542 for handling IO errors that are received through the in-band path from the storage system. In one embodiment, the IO errors received by error handling unit 542 are propagated through the PEs by I/O manager 304. Examples of IO error classes include path errors between computer system 101 and the PEs, PE errors, and vvol errors. The error handling unit 542 classifies all detected errors into aforementioned classes. When a path error to a PE is encountered and another path to the PE exists, data access layer 540 transmits the IO along a different path to the PE. When the IO error is a PE error, error handing unit 542 updates block device database 533 to indicate an error condition for each block device issuing IOs through the PE. When the IO error is a vvol error, error handing unit 542 updates block device database 533 to indicate an error condition for each block device associated with the vvol. Error handing unit 542 may also issue an alarm or system event so that further IOs to block devices having the error condition will be rejected.

Figure 5B:
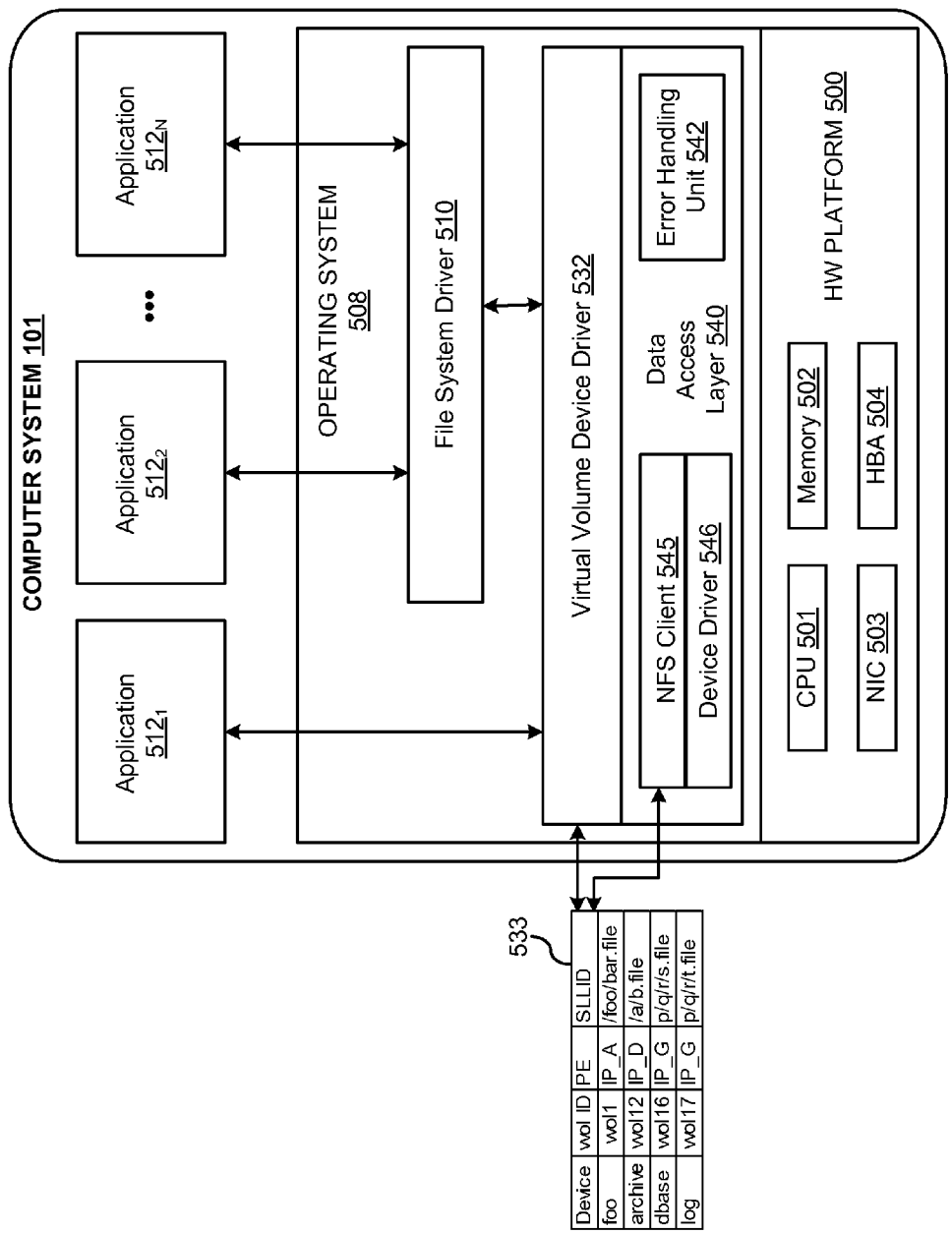
FIG. 5B is a block diagram of the computer system of FIG. 5A configured for virtual volumes hosted on a NAS-based storage system.

FIG. 5B is a block diagram of the computer system of FIG. 5A that has been configured to interface with the storage system cluster of FIG. 2B instead of the storage system cluster of FIG. 2A. In this embodiment, data access layer 540 includes an NFS client 545 and a device driver 546 for NIC 503. NFS client 545 maps the block device name to a PE ID (IP address of NAS storage system) and a SLLID which is a NFS file handle corresponding to the block device. This mapping is stored in block device database 533 as shown in FIG. 5B. It should be noted that the Active and CIF columns are still present but not illustrated in the block device database 533 shown in FIG. 5B. As will be described below, an NFS file handle uniquely identifies a file object within the NAS storage system, and may be generated during the bind process. Alternatively, in response to a request to bind the vvol, the NAS storage system returns the PE ID and the SLLID, and an open of the vvol using regular in-band mechanisms (e.g., lookup or readdirplus) will give the NFS file handle. NFS client 545 also translates the raw block-level IOs received from virtual volume device driver 532 to NFS file-based IOs. Device driver 546 for NIC 503 then formats the NFS file-based IOs in a protocol-compliant format and sends them to NIC 503, along with the NFS handle, for forwarding to one of the PEs via an in-band path.

Figure 5C:
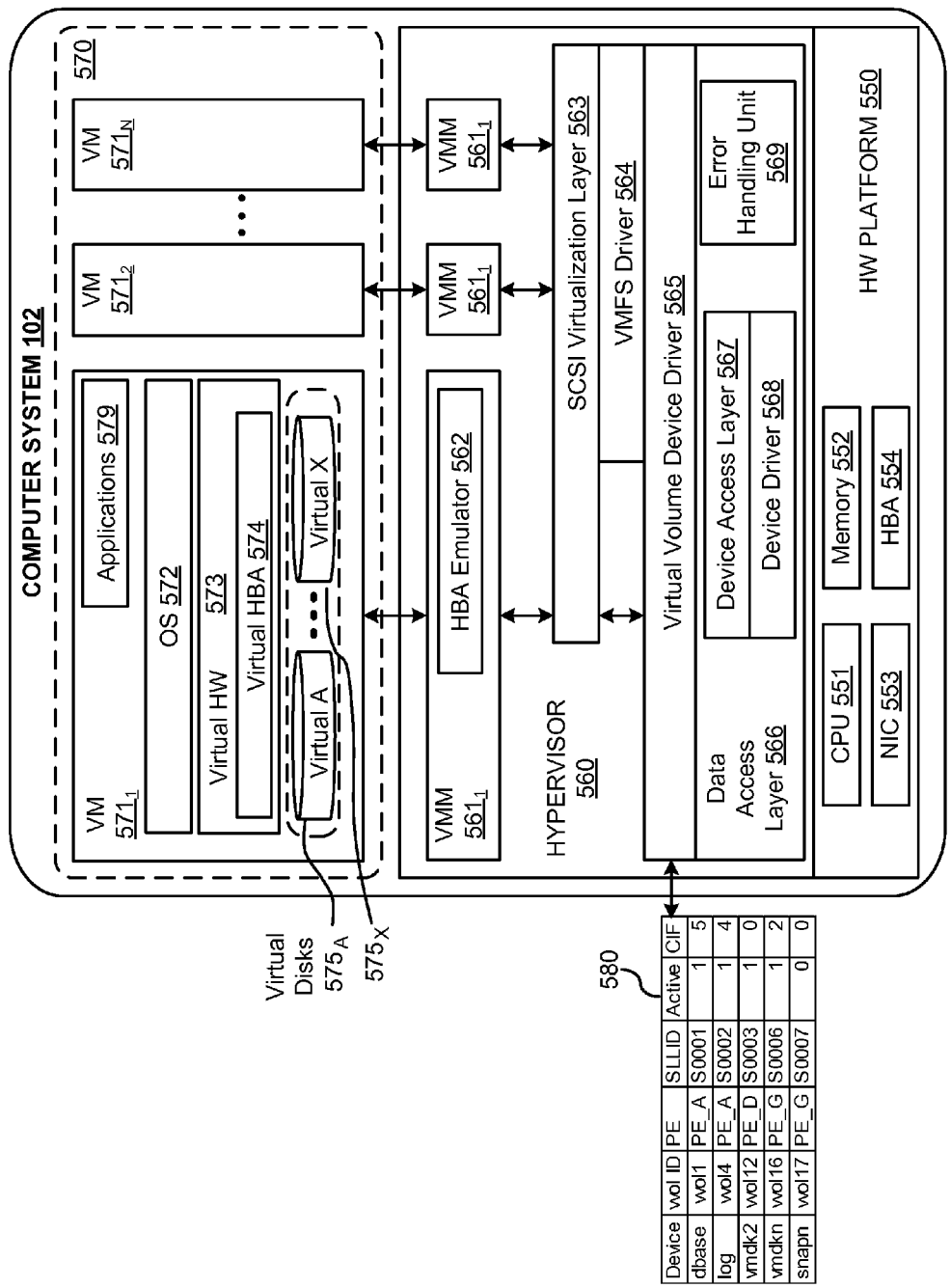
FIG. 5C is a block diagram of another embodiment of a computer system configured to implement virtual volumes hosted on a SAN-based storage system.

FIG. 5C is a block diagram of another embodiment of a computer system configured to implement virtual volumes. In this embodiment, computer system 102 is configured with virtualization software, shown herein as hypervisor 560. Hypervisor 560 is installed on top of hardware platform 550, which includes CPU 551, memory 552, NIC 553, and HBA 554, and supports a virtual machine execution space 570 within which multiple virtual machines (VMs) $571_1$-$571_N$ may be concurrently instantiated and executed. In one or more embodiments, hypervisor 560 and virtual machines 571 are implemented using the VMware vSphere® product distributed by VMware, Inc. of Palo Alto, Calif. Each virtual machine 571 implements a virtual hardware platform 573 that supports the installation of a guest operating system (OS) 572 which is capable of executing applications 579. Examples of a guest OS 572 include any of the well-known commodity operating systems, such as Microsoft Windows, Linux, and the like. In each instance, guest OS 572 includes a native file system layer (not shown in FIG. 5C), for example, either an NTFS or an ext3FS type file system layer. These file system layers interface with virtual hardware platforms 573 to access, from the perspective of guest OS 572, a data storage HBA, which in reality, is virtual HBA 574 implemented by virtual hardware platform 573 that provides the appearance of disk storage support (in reality, virtual disks or virtual disks $575_A$-$575_X$) to enable execution of guest OS 572. In certain embodiments, virtual disks $575_A$-$575_X$ may appear to support, from the perspective of guest OS 572, the SCSI standard for connecting to the virtual machine or any other appropriate hardware connection interface standard known to those with ordinary skill in the art, including IDE, ATA, and ATAPI. Although, from the perspective of guest OS 572, file system calls initiated by such guest OS 572 to implement file system-related data transfer and control operations appear to be routed to virtual disks $575_A$-$575_X$ for final execution, in reality, such calls are processed and passed through virtual HBA 574 to adjunct virtual machine monitors (VMM) $561_1$-$561_N$ that implement the virtual system support needed to coordinate operation with hypervisor 560. In particular, HBA emulator 562 functionally enables the data transfer and control operations to be correctly handled by hypervisor 560 which ultimately passes such operations through its various layers to HBA 554 that connect to storage systems 130.

According to embodiments described herein, each VM 571 has one or more vvols associated therewith and issues IOs to block device instances of the vvols created by hypervisor 560 pursuant to "CREATE DEVICE" calls by VM 571 into hypervisor 560. The association between block device names and vvol IDs are maintained in block device database 580. IOs from VMs $571_2$-$571_N$ are received by a SCSI virtualization layer 563, which converts them into file IOs understood by a virtual machine file system (VMFS) driver 564. VMFS driver 564 then converts the file IOs to block IOs, and provides the block IOs to virtual volume device driver 565. IOs from VM $571_1$, on the other hand, are shown to bypass VMFS driver 564 and provided directly to virtual volume device driver 565, signifying that VM $571_1$ accesses its block device directly as a raw storage device, e.g., as a database disk, a log disk, a backup archive, and a content repository, in the manner described in U.S. Pat. No. 7,155,558.

When virtual volume device driver 565 receives a block IO, it accesses block device database 580 to reference a mapping between the block device name specified in the IO and the PE ID and SLLID that define the IO session to the vvol associated with the block device name. In the example shown herein, the block device names, dbase and log, corresponds to block device instances of vvol1 and vvol4, respectively, that were created for VM $571_1$, and the block device names, vmdk2, vmdkn, and snapn, correspond to block device instances of vvol12, vvol16, and vvol17, respectively, that were created for one or more of VMs $571_2$-$571_N$. Other information that is stored in block device database 580 includes an active bit value for each block device that indicates whether or not the block device is active, and a CIF (commands-in-flight) value. An active bit of "1" signifies that IOs can be issued to the block device. An active bit of "0" signifies that the block device is inactive and IOs cannot be issued to the block device. The CIF value provides an indication of how many IOs are in flight, i.e., issued but not completed.

In addition to performing the mapping described above, virtual volume device driver 565 issues raw block-level IOs to data access layer 566. Data access layer 566 includes device access layer 567, which applies command queuing and scheduling policies to the raw block-level IOs, and device driver 568 for HBA 554 which formats the raw block-level IOs in a protocol-compliant format and sends them to HBA 554 for forwarding to the PEs via an in-band path. In the embodiment where SCSI protocol is used, the vvol information is encoded in the SCSI LUN data field, which is an 8-byte structure, as specified in SAM-5 (SCSI Architecture Model-5). The PE ID is encoded in the first 2 bytes, which is conventionally used for the LUN ID, and the vvol information, in particular the SLLID, is encoded in the SCSI second level LUN ID, utilizing (a portion of) the remaining 6 bytes. As further shown in FIG. 5C, data access layer 566 also includes an error handling unit 569, which functions in the same manner as error handling unit 542.

Figure 5D:
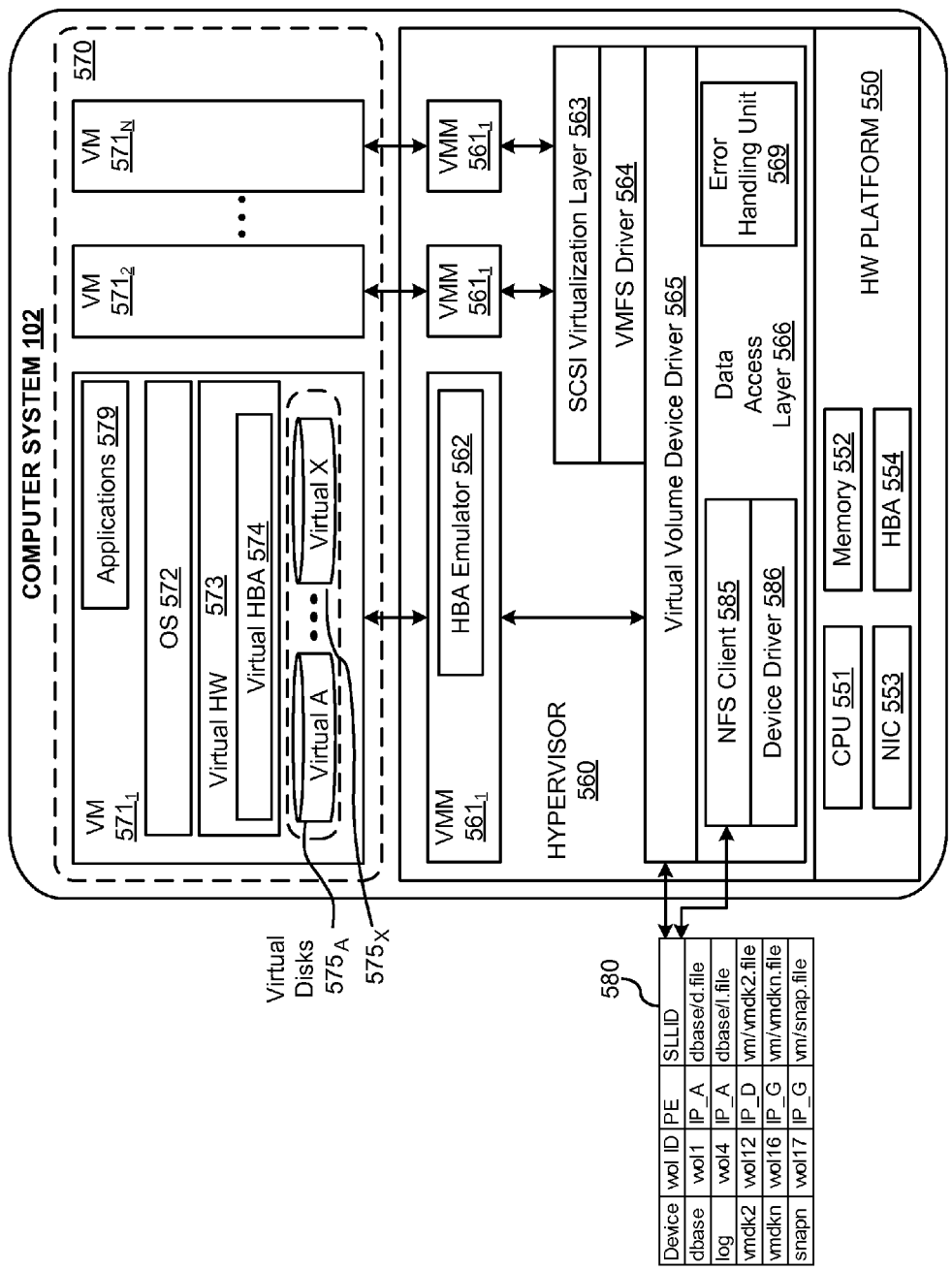
FIG. 5D is a block diagram of the computer system of FIG. 5C configured for virtual volumes hosted on a NAS-based storage system.

FIG. 5D is a block diagram of the computer system of FIG. 5C that has been configured to interface with the storage system cluster of FIG. 2B instead of the storage system cluster of FIG. 2A. In this embodiment, data access layer 566 includes an NFS client 585 and a device driver 586 for NIC 553. NFS client 585 maps the block device name to a PE ID (IP address) and SLLID (NFS file handle) corresponding to the block device. This mapping is stored in block device database 580 as shown in FIG. 5D. It should be noted that the Active and CIF columns are still present but not illustrated in the block device database 580 shown in FIG. 5D. As will be described below, an NFS file handle uniquely identifies a file object within the NFS, and is generated during the bind process in one embodiment. NFS client 585 also translates the raw block-level IOs received from virtual volume device driver 565 to NFS file-based IOs. Device driver 586 for NIC 553 then formats the NFS file-based IOs in a protocol-compliant format and sends them to NIC 553, along with the NFS handle, for forwarding to one of the PEs via an in-band path.

It should be recognized that the various terms, layers and categorizations used to describe the components in FIGS. 5A-5D may be referred to differently without departing from their functionality or the spirit or scope of the invention. For example, VMM 561 may be considered separate virtualization components between VM 571 and hypervisor 560 (which, in such a conception, may itself be considered a virtualization "kernel" component) since there exists a separate VMM for each instantiated VM. Alternatively, each VMM 561 may be considered to be a component of its corresponding virtual machine since such VMM includes the hardware emulation components for the virtual machine. In such an alternative conception, for example, the conceptual layer described as virtual hardware platform 573 may be merged with and into VMM 561 such that virtual host bus adapter 574 is removed from FIGS. 5C and 5D (i.e., since its functionality is effectuated by host bus adapter emulator 562).

FIG. 6 is a simplified block diagram of a computer environment that illustrates components and communication paths used to manage vvols according to an embodiment of the invention. As previously described, the communication path for IO protocol traffic is referred to as the in-band path and is shown in FIG. 6 as dashed line 601 that connects data access layer 540 of the computer system (through an HBA or NIC provided in the computer system) with one or more PEs configured in storage systems 130. The communication paths used to manage vvols are out-of-band paths (as previously defined, paths that are not "in-band") and shown in FIG. 6 as solid lines 602. According to embodiments described herein, vvols can be managed through plug-in 612 provided in management server 610 and/or plug-in 622 provided in each of computer systems 103, only one of which is shown in FIG. 6. On the storage device side, a management interface 625 is configured by storage system manager 131 and a management interface 626 is configured by storage system manager 132. In addition, a management interface 624 is configured by distributed storage system manager 135. Each management interface communicates with plug-ins 612, 622. To facilitate issuing and handling of management commands, special application programming interfaces (APIs) have been developed. It should be recognized that, in one embodiment, both plug-ins 612, 622 are customized to communicate with storage hardware from a particular storage system vendor. Therefore, management server 610 and computer systems 103 will employ different plug-ins when communicating with storage hardware for different storage system vendors. In another embodiment, there may be a single plug-in that interacts with any vendor's management interface. This would require the storage system manager to be programmed to a well-known interface (e.g., by virtue of being published by the computer system and/or the management server).

Management server 610 is further configured with a system manager 611 for managing the computer systems. In one embodiment, the computer systems are executing virtual machines and system manager 611 manages the virtual machines running in the computer systems. One example of system manager 611 that manages virtual machines is the vSphere® product distributed by VMware, Inc. As shown, system manager 611 communicates with a host daemon (hostd) 621 running in computer system 103 (through appropriate hardware interfaces at both management server 610 and computer system 103) to receive resource usage reports from computer system 103 and to initiate various management operations on applications running in computer system 103.

Figure 7:
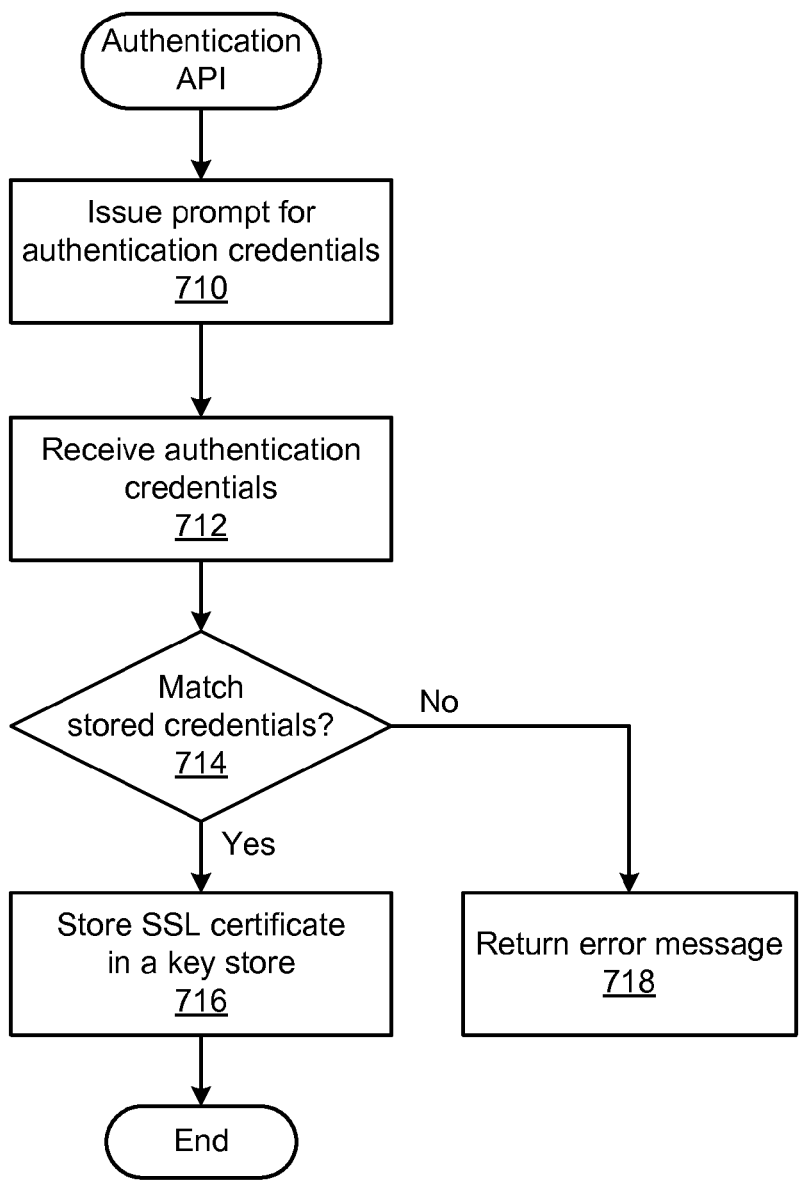
FIG. 7 is a flow diagram of method steps for authenticating a computer system to the storage system cluster of FIG. 2A or 2B.

FIG. 7 is a flow diagram of method steps for authenticating a computer system to the storage system cluster of FIG. 2A or 2B using an authentication related API. These method steps are initiated when a computer system requests authentication by transmitting its secure socket layer (SSL) certificate to the storage system. At step 710, the storage system issues a prompt for authentication credentials (e.g., username and password) to the computer system requesting authentication. Upon receipt of the authentication credentials at step 712, the storage system compares them against stored credentials at step 714. If the correct credentials are provided, the storage system stores the SSL certificate of the authenticated computer system in a key store (step 716). If incorrect credentials are provided, the storage system ignores the SSL certificate and returns an appropriate error message (step 718). Subsequent to being authenticated, the computer system may invoke the APIs to issue management commands to the storage system over SSL links, and unique context IDs included in the SSL certificates are used by the storage system to enforce certain policies such as defining which computer systems may access which storage containers. In some embodiments, context IDs of the computer systems may be used in managing permissions granted to them. For example, a host computer may be permitted to create a vvol, but may not be permitted to delete the vvol or snapshot the vvol, or a host computer may be permitted to create a snapshot of a vvol, but may not be permitted to clone the vvol. In addition, permissions may vary in accordance with user-level privileges of users who are logged into authenticated computer systems.

Figure 8:
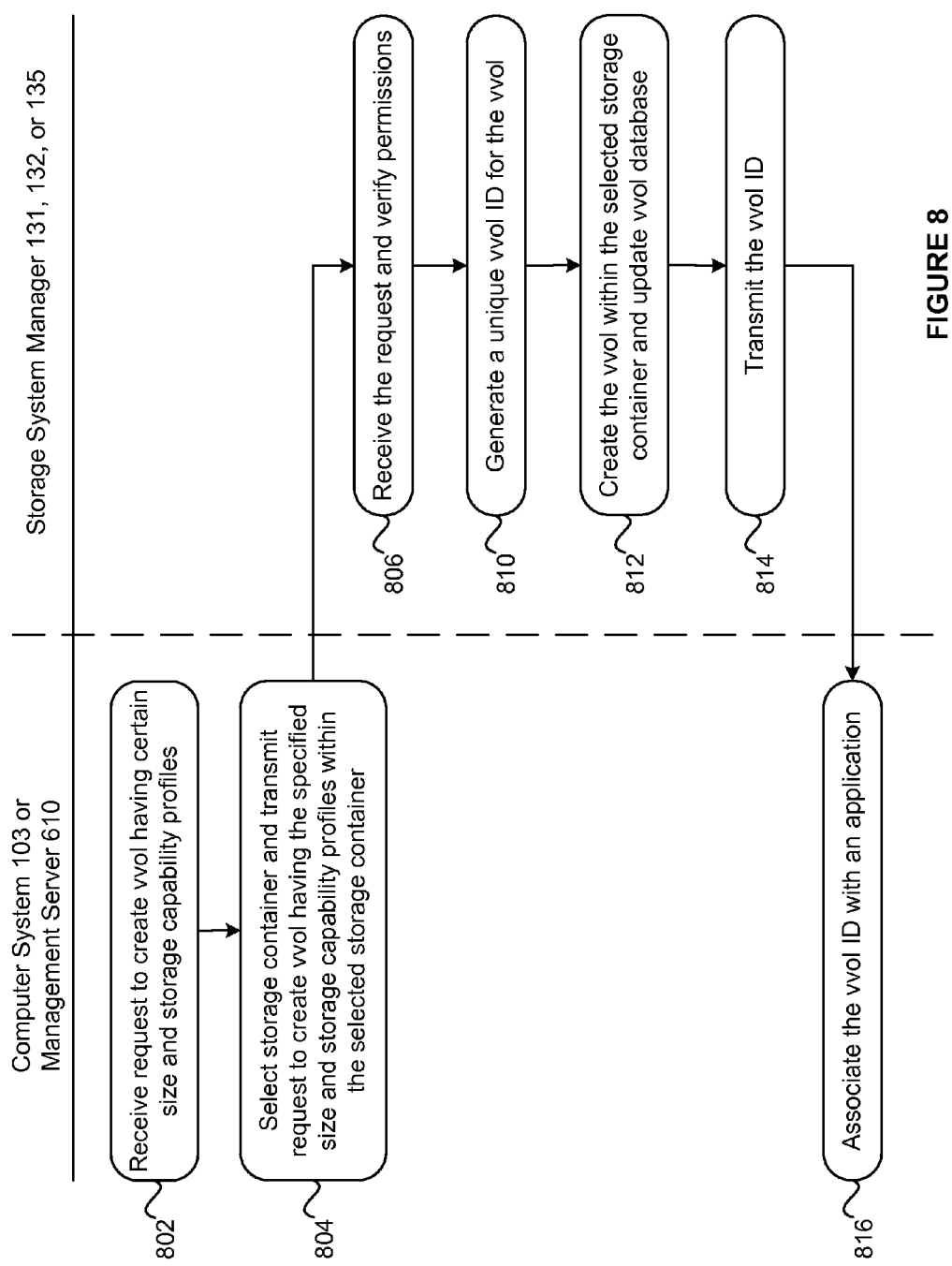
FIG. 8 is a flow diagram of method steps for creating a virtual volume, according to one embodiment.

FIG. 8 is a flow diagram of method steps for creating a virtual volume using a create virtual volumes API command. In one embodiment, computer system 103 issues the create virtual volumes API command to the storage system via out-of-band path 602 when, at step 802, computer system 103 receives a request to create a vvol having certain size and storage capability profiles, such as minimum IOPS and average latency, from one of its applications. In response, computer system 103, at step 804, selects a storage container (among those that computer system 103 and the requesting application is permitted to access and have sufficient free capacity to accommodate the request) and issues the create virtual volumes API command via plug-in 622 to the storage system. The API command includes a storage container ID, vvol size, and storage capability profiles of the vvol. In another embodiment, the API command includes a set of key-value pairs that the application requires the storage system to store with the newly created vvol. In another embodiment, management server 610 issues the create virtual volumes API command (via plug-in 612) to the storage system via out-of-band path 602.

At step 806, the storage system manager receives the request to generate the vvol via the management interface (e.g., management interface 624, 625, or 626) and accesses the selected storage container's metadata section in container database 316 to verify that the request context comprising the computer system 103 and application has sufficient permissions to create a vvol in the selected storage container. In one embodiment, an error message is returned to computer system 103 if the permission level is not sufficient. If the permission level is sufficient, a unique vvol ID is generated at step 810. Then at step 812, the storage system manager scans the allocation bitmap in the metadata section of container database 316 to determine free partitions of the selected storage container. The storage system manager allocates the free partitions of the selected storage container sufficient to accommodate the requested vvol size, and updates the allocation bitmap in the storage container's metadata section of container database 316. The storage system manager also updated vvol database 314 with a new vvol entry. The new vvol entry includes the vvol ID generated at step 810, ordered list of newly allocated storage container extents, and metadata of the new vvol expressed as key-value pairs. Then, at step 814, the storage system manager transmits the vvol ID to computer system 103. At step 816, computer system 103 associates the vvol ID with the application that requested creation of the vvol. In one embodiment, one or more vvol descriptor files are maintained for each application and the vvol ID is written into a vvol descriptor file maintained for the application that requested the creation of the vvol.

As shown in FIGS. 2A and 2B, not all vvols are connected to PEs. A vvol that is not connected to a PE is not aware of IOs issued by a corresponding application because an IO session is not established to the vvol. Before IOs can be issued to a vvol, the vvol undergoes a bind process as a result of which the vvol will be bound to a particular PE. Once a vvol is bound to a PE, IOs can be issued to the vvol until the vvol is unbound from the PE.

In one embodiment, the bind request is issued by computer system 103 via an out-of-band path 602 to the storage system using a bind virtual volume API. The bind request identifies the vvol to be bound (using the vvol ID) and in response the storage system binds the vvol to a PE to which computer system 103 is connected via an in-band path. FIG. 9A is a flow diagram of method steps for the computer system to discover PEs to which it is connected via an in-band path. PEs configured in SCSI protocol-based storage devices are discovered via an in-band path using the standard SCSI command, REPORT_LUNS. PEs configured in NFS protocol-based storage devices are discovered via an out-of-band path using an API. The method steps of FIG. 9A are carried out by the computer system for each connected storage system.

At step 910, the computer system determines whether the connected storage system is SCSI protocol-based or NFS protocol-based. If the storage system is SCSI protocol-based, the SCSI command, REPORT_LUNS, is issued by the computer system in-band to the storage system (step 912). Then, at step 913, the computer system examines the response from the storage system, in particular the PE bit associated with each of the PE IDs that are returned, to distinguish between the PE-related LUNs and the convention data LUNs. If the storage system is NFS protocol-based, an API call is issued by the computer system out-of-band from plug-in 622 to the management interface (e.g., management interface 624, 625, or 626) to get IDs of available PEs (step 914). At step 916, which follows steps 913 and 914, the computer system stores the PE IDs of PE-related LUNs returned by the storage system or the PE IDs returned by the management interface, for use during a bind process. It should be recognized that the PE IDs returned by SCSI protocol-based storage devices each include a WWN, and the PE IDs returned by NFS protocol-based storage devices each include an IP address and mount point.

FIG. 9B is a flow diagram of method steps for the storage system manager 131 or storage system manager 132 or distributed storage system manager 135 (hereinafter referred to as "the storage system manager") to discover PEs to which a given computer system 103 is connected via an in-band path. The discovery of such PEs by a storage system manager enables the storage system to return to a requesting computer system, a valid PE ID, onto which the computer system can be actually connected, in response to a bind request from the computer system. At step 950, the storage system manager issues an out-of-band "Discover_Topology" API call to the computer system 103 via the management interface and plug-in 622. Computer system 103 returns its system ID and a list of all PE IDs that it discovered via the flow diagram of FIG. 9A. In one embodiment, the storage system manager executes step 950 by issuing a "Discover_Topology" API call to management server 610 via the management interface and plug-in 612. In such an embodiment, the storage system will receive a response that contains multiple computer system IDs and associated PE IDs, one for each computer system 103 that management server 610 manages. Then, at step 952, the storage system manager processes the results from step 950. For example, the storage system manager clears the list of all PE IDs that are not under its current control. For example, certain PE IDs received by the storage system manager 135 when issuing a Discover_Topology call may correspond to another storage system connected to the same computer system. Similarly, certain received PE IDs may correspond to older PEs that were since deleted by the storage system administrator, and so on. At step 954, the storage system manager caches the processed results for use during subsequent bind requests. In one embodiment, the storage system manager runs the steps of FIG. 9B periodically to update its cached results with ongoing computer system and network topology changes. In another embodiment, the storage system manager runs the steps of FIG. 9B every time it receives a new vvol creation request. In yet another embodiment, the storage system manager runs the steps of FIG. 9B after running the authentication steps of FIG. 7.

Figure 10:
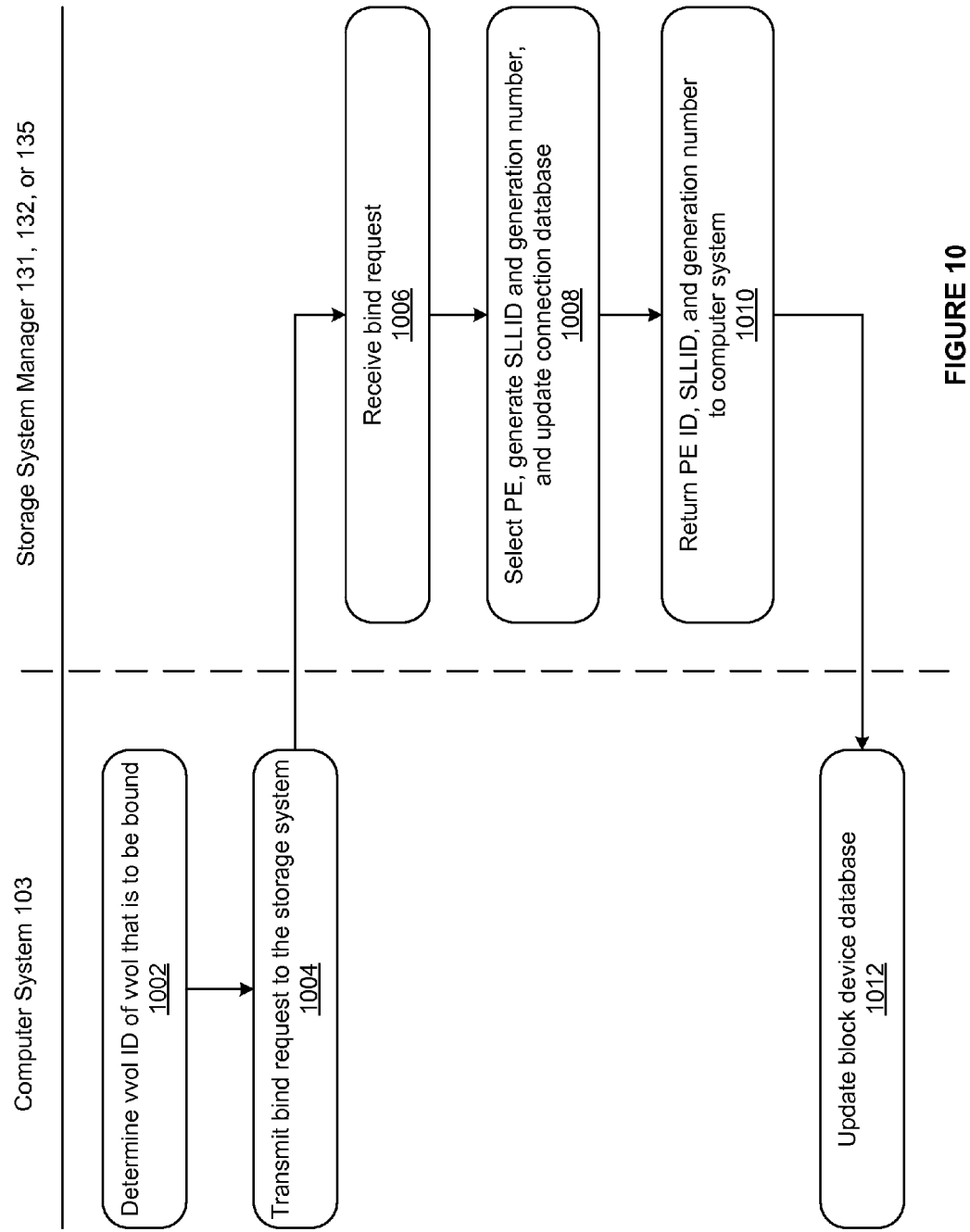
FIG. 10 is a flow diagram of method steps for issuing and executing a virtual volume bind request, according to one embodiment.

FIG. 10 is a flow diagram of method steps for issuing and executing a virtual volume bind request using a bind virtual volume API. In one embodiment, computer system 103 issues the bind request to the storage system via out-of-band path 602 when one of its applications requests IO access to a block device associated with a vvol that has not yet been bound to a PE. In another embodiment, management server 610 issues the bind request in connection with certain VM management operations, including VM power on and vvol migration from one storage container to another.

Continuing with the example described above where an application requests IO access to a block device associated with vvol that has not yet been bound to a PE, computer system 103 at step 1002 determines from the block device database 533 (or 580), the vvol ID of the vvol. Then, at step 1004, computer system 103 issues through the out-of-band path 602 a request to bind the vvol to the storage system.

The storage system manager receives the request to bind the vvol via the management interface (e.g., management interface 624, 625, or 626) at step 1006, and then carries out step 1008, which includes selecting a PE to which the vvol is to be bound, generating SLLID and generation number for the selected PE, and updating connection database 312 (e.g., via IO manager 304). The selection of the PE to which the vvol is to be bound is made according to connectivity, i.e., only the PEs that have an existing in-band connection to computer system 103 are available for selection, and other factors, such as current IO traffic through the available PEs. In one embodiment, the storage system selects from the processed and cached list of PEs the computer system 103 sent to it according to the method of FIG. 9B. SLLID generation differs between the embodiment employing the storage system cluster of FIG. 2A and the embodiment employing the storage system cluster of FIG. 2B. In the former case, an SLLID that is unique for the selected PE is generated. In the latter case, a file path to the file object corresponding to the vvol is generated as the SLLID. After the SLLID and the generation number have been generated for the selected PEs, connection database 312 is updated to include newly generated IO session to the vvol. Then, at step 1010, ID of the selected PE, the generated SLLID, and the generation number are returned to computer system 103. Optionally, in the embodiment employing the storage system cluster of FIG. 2B, a unique NFS file handle may be generated for the file object corresponding to the vvol and returned to computer system 103 along with the ID of the selected PE, the generated SLLID, and the generation number. At step 1012, computer system 103 updates block device database 533 (or 580) to include the PE ID, the SLLID (and optionally, the NFS handle), and the generation number returned from the storage system. In particular, each set of PE ID, SLLID (and optionally, the NFS handle), and the generation number returned from storage system will be added as a new entry to block device database 533 (or 580). It should be recognized that the generation number is used to guard against replay attacks. Therefore, in embodiments where replay attacks are not a concern, the generation number is not used.

On subsequent bind requests to the same vvol initiated by a different application desiring to issue IOs to the same vvol, the storage system manager may bind the vvol to the same or different PE. If the vvol is bound to the same PE, the storage system manager returns the ID of the same PE and the SLLID previously generated, and increments the reference count of this IO connection path stored in connection database 312. On the other hand, if the vvol is bound to a different PE, the storage system manager generates a new SLLID and returns the ID of the different PE and the newly generated SLLID and adds this new IO connection path to the vvol as a new entry to connection database 312.

A virtual volume unbind request may be issued using an unbind virtual volume API. An unbind request includes the PE ID and SLLID of the IO connection path by which a vvol has been previously bound. The processing of the unbind request is, however, advisory. The storage system manager is free to unbind the vvol from a PE immediately or after a delay. The unbind request is processed by updating connection database 312 to decrement the reference count of the entry containing the PE ID and SLLID. If the reference count is decremented to zero, the entry may be deleted. It should be noted, in this case, that the vvol continues to exist, but is not available for IO using the given PE ID and SLLID any more.

In the case of a vvol that implements a virtual disk of a VM, the reference count for this vvol will be at least one. When the VM is powered-off and an unbind request is issued in connection therewith, the reference count will be decremented by one. If the reference count is zero, the vvol entry may be removed from connection database 312. In general, removing entries from connection database 312 is beneficial because I/O manager 304 manages less data and can also recycle SLLIDs. Such benefits become significant when the total number of vvols stored by the storage system is large (e.g., in the order of millions of vvols) but the total number of vvols being actively accessed by applications is small (e.g., tens of thousands of VMs). Additionally, when a vvol is not bound to any PEs, the storage system has greater flexibility in choosing where to store the vvol in DSUs 141. For example, the storage system can be implemented with asymmetrical, hierarchical DSUs 141, where some DSUs 141 provide faster data access and others provide slower data access (e.g., to save on storage costs). In one implementation, when a vvol is not bound to any PE (which can be determined by checking the reference count of entries of the vvol in connection database 312), the storage system can migrate the vvol to a slower and/or cheaper type of physical storage. Then, once the vvol is bound to a PE, the storage system can migrate the vvol to a faster type of physical storage. It should be recognized that such migrations can be accomplished by changing one or more elements of the ordered list of container locations that make up the given vvol in the vvol database 314, and updating the corresponding extent allocation bitmap in the metadata section of container database 316.

Binding and unbinding vvols to PEs enables the storage system manager to determine vvol liveness. The storage system manager may take advantage of this information to perform storage system vendor-specific optimizations on non-IO-serving (passive) and IO-serving (active) vvols. For example, the storage system manager may be configured to relocate a vvol from a low-latency (high cost) SSD to a mid-latency (low cost) hard drive if it remains in a passive state beyond a particular threshold of time.

Figures 11A, 11B:
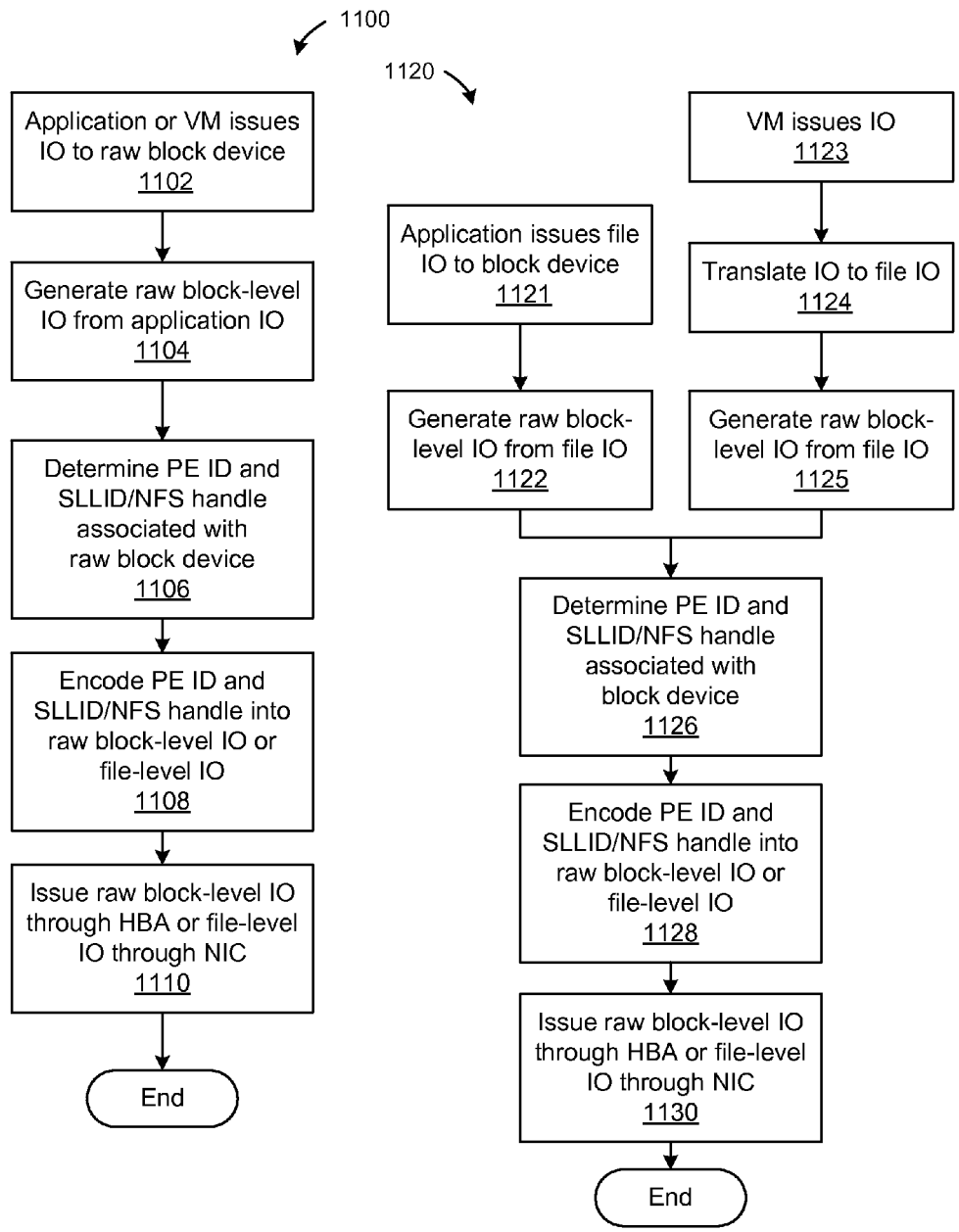
FIGS. 11A and 11B are flow diagrams of method steps for issuing an IO to a virtual volume, according to one embodiment.

FIGS. 11A and 11B are flow diagrams of method steps for issuing an IO to a virtual volume, according to one embodiment. FIG. 11A is a flow diagram of method steps 1100 for issuing an IO from an application directly to a raw block device and FIG. 11B is a flow diagram of method steps 1120 for issuing an IO from an application through a file system driver.

Method 1100 begins at step 1102, where an application, such as application 512 shown in FIGS. 5A-5B or VM 571 shown in FIG. 5C-5D, issues an IO to a raw block device. At step 1104, virtual volume device driver 532 or 565 generates a raw block-level IO from the IO issued by the application. At step 1106, the name of the raw block device is translated to a PE ID and SLLID by virtual volume device driver 532 or 565 (and also to an NFS handle by NFS client 545 or 585 in the embodiment employing the storage device of FIG. 2B). At step 1108, the data access layer 540 or 566 carries out the encoding of the PE ID and SLLID (and also the NFS handle in the embodiment employing the storage device of FIG. 2B) into the raw block-level IO. Then, at step 1110, the HBA/NIC issues the raw block-level IO.

For non-VM applications, such as application 512 shown in FIGS. 5A-5B, method 1120 begins at step 1121. At step 1121, the application issues an IO to a file stored on a vvol-based block device. Then, at step 1122, the file system driver, e.g., file system driver 510, generates a block-level IO from the file IO. After step 1122, steps 1126, 1128, and 1130, which are identical to steps 1106, 1108, and 1110, are carried out.

For VM applications, such as VM 571 shown in FIG. 5C-5D, method 1120 begins at step 1123. At step 1123, the VM issues an IO to its virtual disk. Then, at step 1124, this IO is translated to a file IO, e.g., by SCSI virtualization layer 563. The file system driver, e.g., VMFS driver 564, then generates a block-level IO from the file IO at step 1125. After step 1125, steps 1126, 1128, and 1130, which are identical to steps 1106, 1108, and 1110, are carried out.

Figure 12:
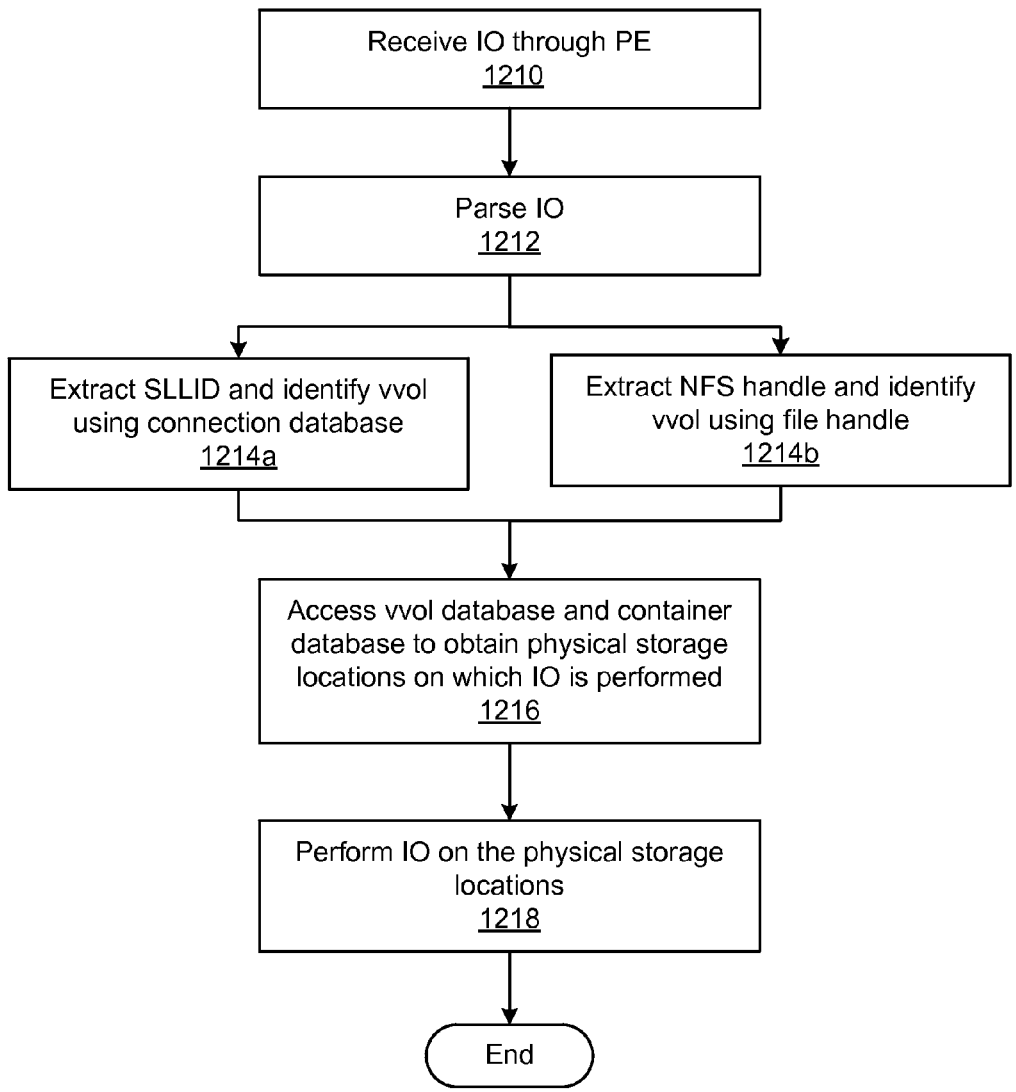
FIG. 12 is a flow diagram of method steps for performing an IO at a storage system, according to one embodiment.

FIG. 12 is a flow diagram of method steps for performing an IO at a storage system, according to one embodiment. At step 1210, an IO issued by a computer system is received through one of the PEs configured in the storage system. The IO is parsed by IO manager 304 at step 1212. After step 1212, step 1214a is carried out by IO manager 304 if the storage system cluster is of the type shown in FIG. 2A and step 1214b is carried out by IO manager 304 if the storage system cluster is of the type shown in FIG. 2B. At step 1214a, IO manager 304 extracts the SLLID from the parsed IO and accesses connection database 312 to determine the vvol ID corresponding to the PE ID and the extracted SLLID. At step 1214b, IO manager 304 extracts the NFS handle from the parsed IO and identifies the vvol using the PE ID and the NFS handle as the SLLID. Step 1216 is carried out after steps 1214a and 1214b. At step 1216, vvol database 314 and container database 316 are accessed by volume manager 306 and container manager 308, respectively, to obtain physical storage locations on which the IO is to be performed. Then, at step 1218, data access layer 310 performs the IO on the physical storage locations obtained at step 1216.

Figure 13:
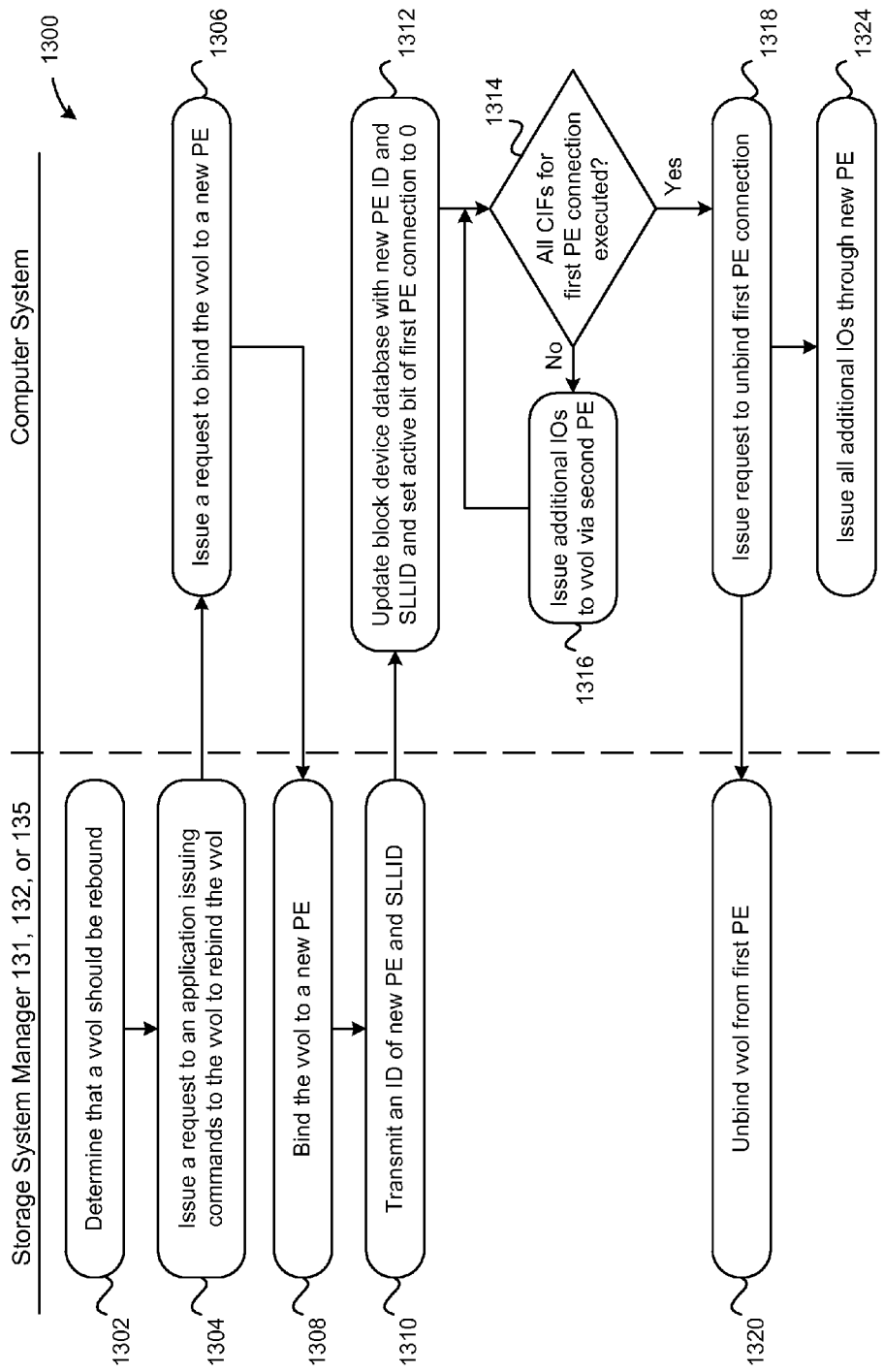
FIG. 13 is a flow diagram of method steps for issuing and executing a virtual volume rebind request, according to one embodiment.

In some situations, an application (application 512 or VM 571), management server 610, and/or the storage system manager may determine that a binding of a vvol to a particular PE is experiencing issues, such as when the PE becomes overloaded with too many bindings. As a way to resolve such issues, a bound vvol may be rebound by the storage system manager to a different PE, even while IO commands are being directed to the vvol. FIG. 13 is a flow diagram of method steps 1300 for issuing and executing a vvol rebind request, according to one embodiment, using a rebind API.

As shown, method 1300 begins at step 1302, where the storage system manager determines that a vvol should be bound to a second PE that is different from a first PE to which the vvol is currently bound. At step 1304, the storage system manager issues via an out-of-band path a request to a computer system (e.g., computer system 103) running an application issuing IO to the vvol to rebind the vvol. At step 1306, computer system 103 receives from the storage system manager the rebind request and, in response, issues a request to bind the vvol to a new PE. At step 1308, the storage system manager receives the rebind request and, in response, binds the vvol to the new PE. At step 1310, the storage system manager transmits to the computer system an ID of the new PE to which the vvol is now also bound and an SLLID to access the vvol, as described above in conjunction with FIG. 10.

At step 1312, the computer system receives from the storage system manager the new PE ID and the SLLID. In block device database 533 or 580, the active bit of the new PE connection is set to 1 initially, meaning that a new IO session for the vvol via the new PE has been established. The computer system also sets the active bit of the first PE connection to 0, signifying that no more IOs can be issued to the vvol through this PE connection. It should be recognized that this PE connection should not be unbound immediately upon deactivation because there may be IOs to the vvol through this PE connection that may be in-flight, i.e., issued but not completed. Therefore, at step 1314, the computer system accesses block device database 533 or 580 to see if all "commands in flight" (CIFs) issued to the vvol through the first PE connection have been completed, i.e., if CIF=0. The computer system waits for the CIF to go to zero before executing step 1318. In the meantime, additional IOs to the vvol are issued through the new PE since the active bit of the new PE connection is already set to 1. When the CIF does reach zero, step 1318 is carried out where a request to unbind the first PE connection is issued to the storage system manager. Then, at step 1320, the storage system manager unbinds the vvol from the first PE. Also, the computer system issues all additional IOs to the vvol through the new PE at step 1324.

Figure 14:
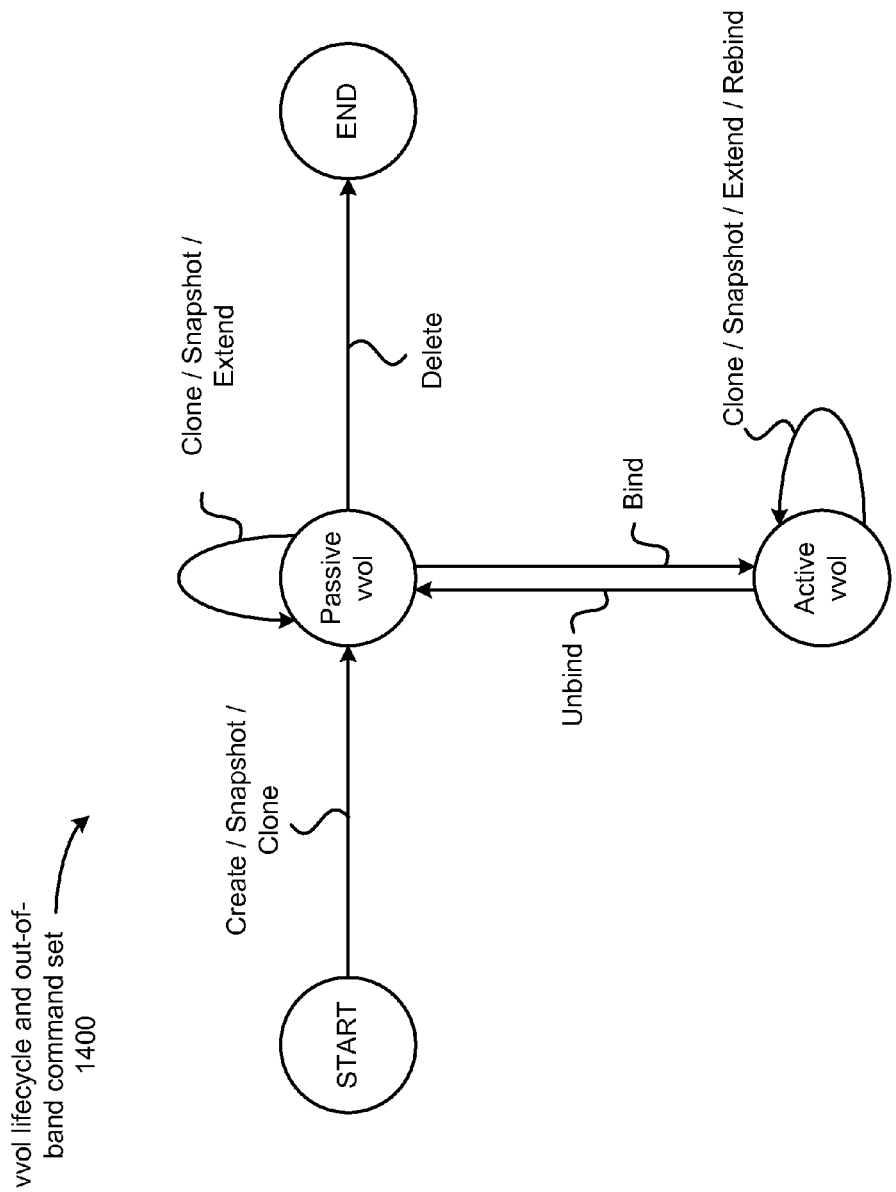
FIG. 14 is a conceptual diagram of a lifecycle of a virtual volume.

FIG. 14 is a conceptual diagram of a lifecycle of a virtual volume, according to one embodiment. All commands shown in FIG. 14, namely, create, snapshot, clone, bind, unbind, extend, and delete form a vvol management command set, and are accessible through plug-ins 612, 622 described above in conjunction with FIG. 6. As shown, when a vvol is generated as a result of any of the following commands—create vvol, snapshot vvol, or clone vvol—the generated vvol remains in a "passive" state, where the vvol is not bound to a particular PE, and therefore cannot receive IOs. In addition, when any of the following commands—snapshot vvol, clone vvol, or extend vvol—is executed when the vvol is in a passive state, the original vvol and the newly created vvol (if any) remains in the passive state. As also shown, when a vvol in a passive state is bound to a PE, the vvol enters an "active" state. Conversely, when an active vvol is unbound from a PE, the vvol enters a passive state, assuming that the vvol is not bound to any additional PEs. When any of the following commands—snapshot vvol, clone vvol, extend vvol, or rebind vvol—is executed when the vvol is in an active state, the original vvol remains in the active state and the newly created vvol (if any) remains in the passive state.

As described above, a VM may have multiple virtual disks and a separate vvol is created for each virtual disk. The VM also has metadata files that describe the configurations of the VM. The metadata files include VM configuration file, VM log files, disk descriptor files, one for each of the virtual disks for the VM, a VM swap file, etc. A disk descriptor file for a virtual disk contains information relating to the virtual disk such as its vvol ID, its size, whether the virtual disk is thinly provisioned, and identification of one or more snapshots created for the virtual disk, etc. The VM swap file provides a swap space of the VM on the storage system. In one embodiment, these VM configuration files are stored in a vvol, and this vvol is referred to herein as a metadata vvol.

Figure 15:
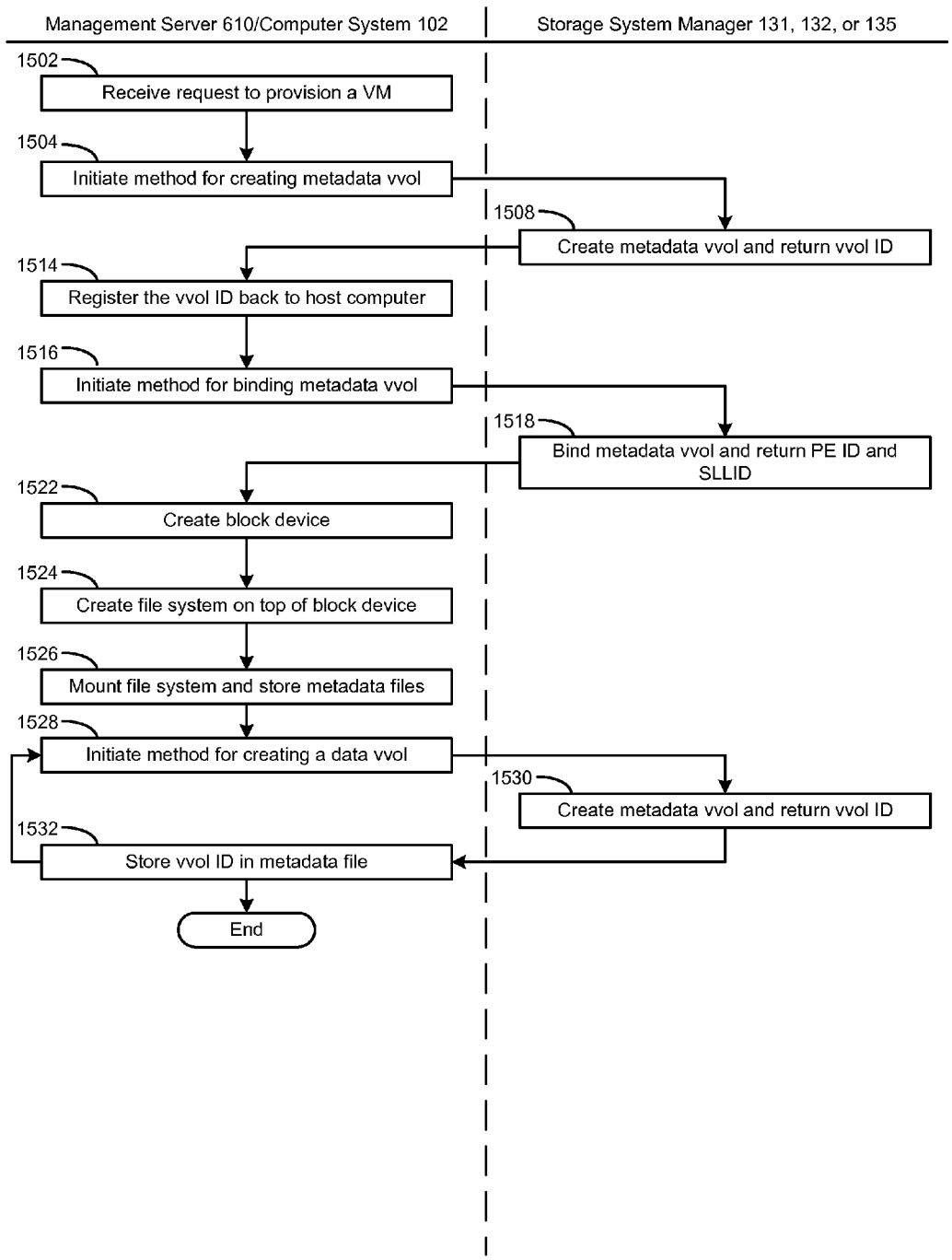
FIG. 15 is a flow diagram of method steps for provisioning a VM, according to an embodiment using the storage system of FIG. 2A.

FIG. 15 is a flow diagram of method steps for provisioning a VM, according to an embodiment. In this embodiment, management server 610, a computer system hosting the VM, e.g., computer system 102 shown in FIG. 5C (hereinafter referred to as the "host computer"), and the storage system cluster of FIG. 2A, in particular storage system manager 131, 132, or 135, are used. As illustrated, the storage system manager receives the request to provision the VM at step 1502. This may be a request generated when a VM administrator using appropriate user interfaces to management server 610 issues a command to management server 610 to provision a VM having a certain size and storage capability profiles. In response thereto, at step 1504, management server 610 initiates the method for creating a vvol to contain the VM's metadata (hereinafter referred to as "metadata vvol") in the manner described above in conjunction with FIG. 8, pursuant to which the storage system manager at step 1508 creates the metadata vvol and returns the vvol ID of the metadata vvol to management server 610. At step 1514, management server 610 registers the vvol ID of the metadata vvol back to a computer system hosting the VM. At step 1516, the host computer initiates the method for binding the metadata vvol to a PE in the manner described above in conjunction with FIG. 10, pursuant to which the storage system manager at step 1518 binds the metadata vvol to a PE and returns the PE ID and a SLLID to the host computer.

At step 1522, the host computer creates a block device instance of the metadata vvol using the "CREATE DEVICE" call into the host computer's operating system. Then, at step 1524, the host computer creates a file system (e.g., VMFS) on the block device in response to which a file system ID (FSID) is returned. The host computer, at step 1526, mounts the file system having the returned FSID, and stores the metadata of the VM into the namespace associated with this file system. Examples of the metadata include VM log files, disk descriptor files, one for each of the virtual disks for the VM, and a VM swap file.

At step 1528, the host computer initiates the method for creating a vvol for each of the virtual disks of the VM (each such vvol referred to herein as "data vvol") in the manner described above in conjunction with FIG. 8, pursuant to which the storage system manager at step 1530 creates the data vvol and returns the vvol ID of the data vvol to the host computer. At step 1532, the host computer stores the ID of the data vvol in the disk descriptor file for the virtual disk. The method ends with the unbinding of the metadata vvol (not shown) after data vvols have been created for all of the virtual disks of the VM.

FIG. 16A is a flow diagram of method steps for powering ON a VM after the VM has been provisioned in the manner described in conjunction with FIG. 15. FIG. 16B is a flow diagram of method steps for powering OFF a VM after the VM has been powered ON. These two methods are carried out by a host computer for the VM.

Upon receiving a VM power ON command at step 1608, the ID of the metadata vvol corresponding to the VM is retrieved at step 1610. Then, at step 1612 the metadata vvol undergoes a bind process as described above in conjunction with FIG. 10. The file system is mounted on the metadata vvol at step 1614 so that the metadata files for the data vvols, in particular the disk descriptor files, can be read and data vvol IDs obtained at step 1616. The data vvols then undergo a bind process, one by one, as described above in conjunction with FIG. 10 at step 1618.

Upon receiving a VM power OFF command at step 1620, the data vvols of the VM are marked as inactive in the block device database (e.g., block device database 580 of FIG. 5C)

and the host computer waits for the CIFs associated with each of the data vvols to reach zero (step 1622). As the CIF associated with each data vvol reaches zero, the host computer at step 1624 requests the storage system to unbind that data vvol. After the CIFs associated with all data vvols reach zero, the metadata vvol is marked as inactive in the block device database at step 1626. Then, at step 1628, when the CIF associated with the metadata vvol reaches zero, the host computer at step 1630 requests the metadata vvol to be unbound.

Figure 17:
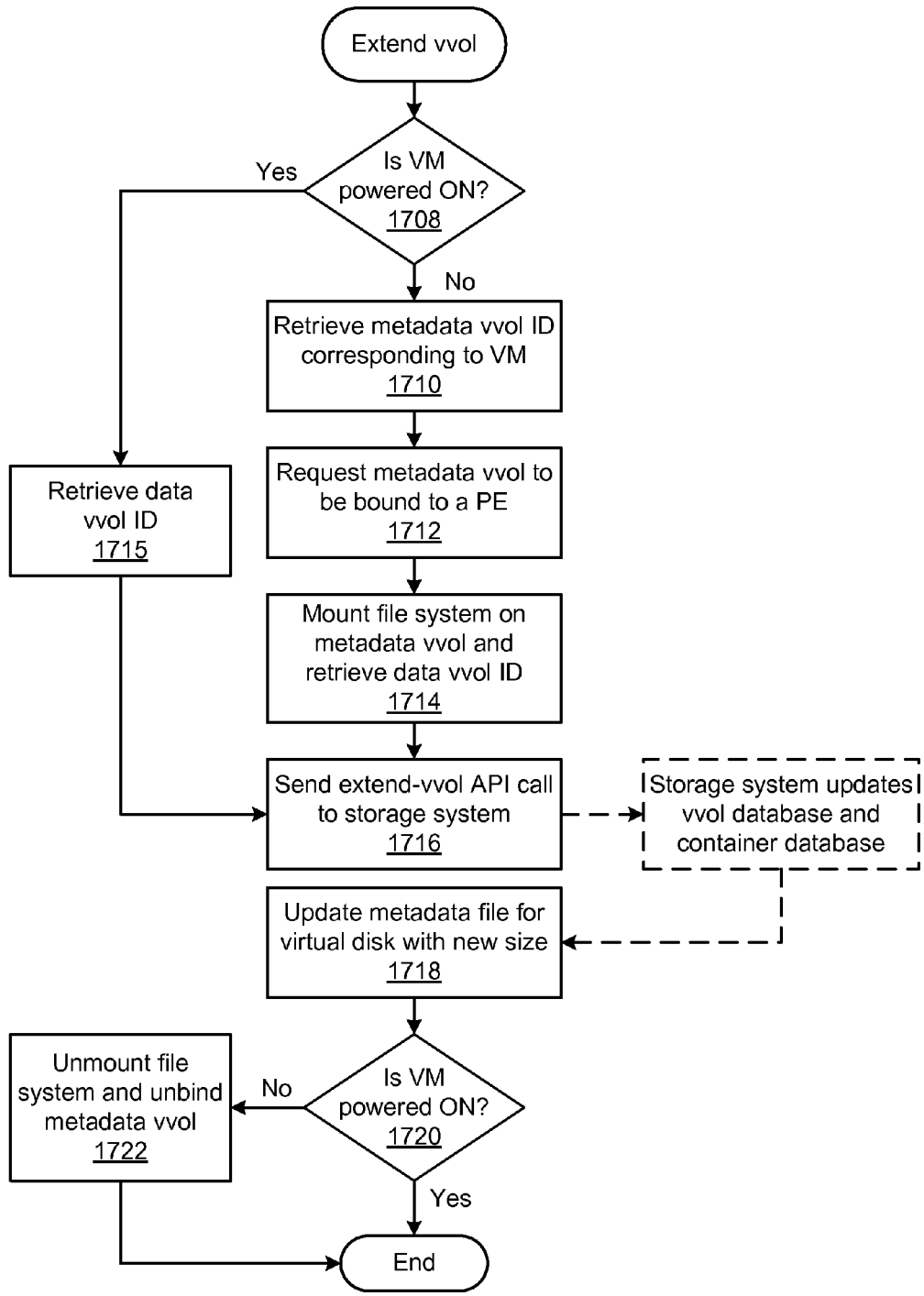
FIG. 17 is a flow diagram of method steps for extending the size of a vvol of a VM.
Figure 18:
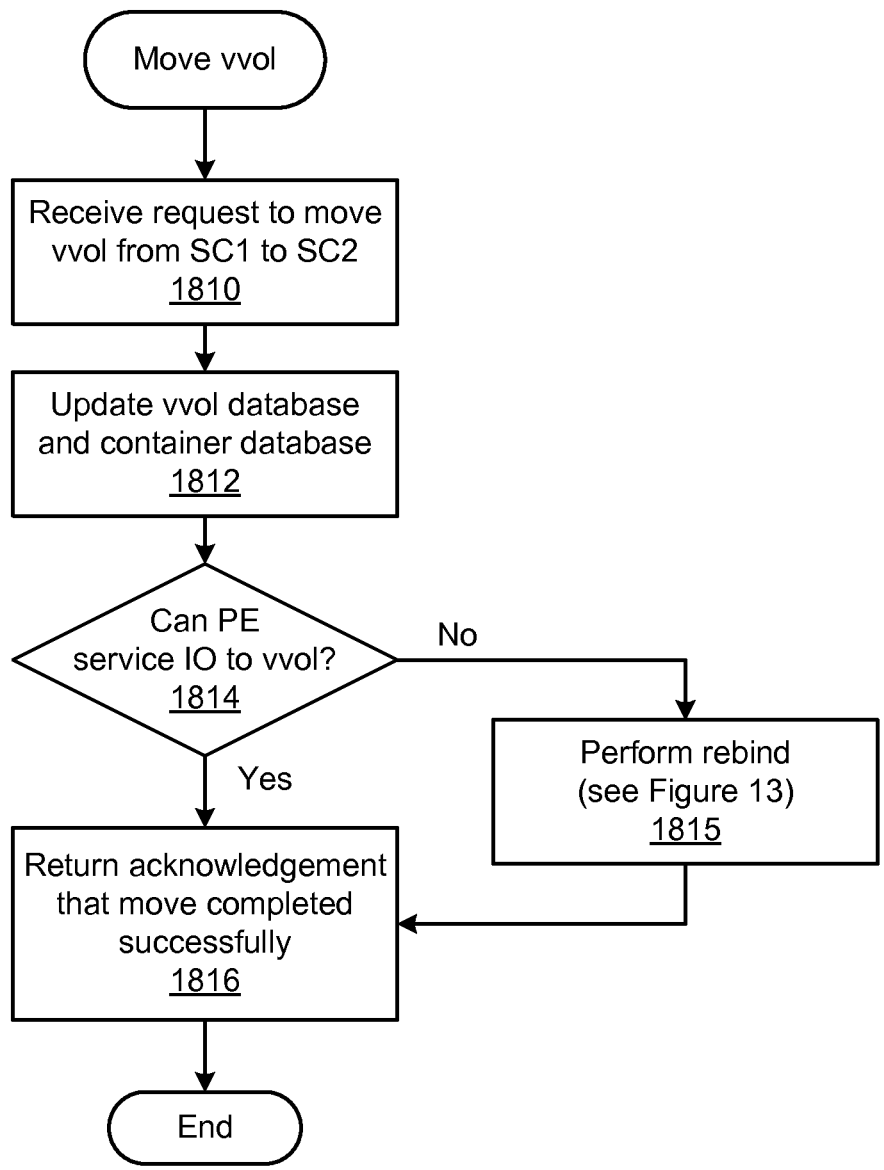
FIG. 18 is a flow diagram of method steps for moving a vvol of VM between storage containers.

FIGS. 17 and 18 are flow diagrams of method steps for reprovisioning a VM. In the examples illustrated herein, FIG. 17 is a flow diagram of method steps executed on the host computer, for extending the size of a vvol of a VM, in particular a data vvol for a virtual disk of the VM, and FIG. 18 is a flow diagram of method steps executed in the storage system, for moving a vvol of VM between storage containers.

The method for extending the size of a data vvol for a VM's virtual disk begins at step 1708 where the host computer determines if the VM is powered ON. If the host computer determines at step 1708 that the VM is not powered ON, the host computer retrieves the ID of the metadata vvol corresponding to the VM at step 1710. Then, the bind process for the metadata vvol is initiated by the host computer at step 1712. After the bind, at step 1714, the host computer mounts a file system on the metadata vvol and retrieves the ID of the data vvol corresponding to the virtual disk from the disk descriptor file for the virtual disk, which is a file in the file system mounted on the metadata vvol. Then, at step 1716, the host computer sends an extend-vvol API call to the storage system at step 1716, where the extend-vvol API call includes the ID of the data vvol and the new size of the data vvol.

If the VM is powered ON, the host computer retrieves the ID of the data vvol of VM's virtual disk to be extended at step 1715. It should be recognized from the method of FIG. 16A that this ID can be obtained from the disk descriptor file associated with the VM's virtual disk. Then, at step 1716, the host computer sends an extend-vvol API call to the storage system at step 1716, where the extend-vvol API call includes the ID of the data vvol and the new size of the data vvol.

The extend-vvol API call results in the vvol database and the container database (e.g., vvol database 314 and container database 316 of FIG. 3) being updated in the storage system to reflect the increased address space of the vvol. Upon receiving acknowledgement that the extend-vvol API call has completed, the host computer at step 1718 updates the disk descriptor file for the VM's virtual disk with the new size. Then, at step 1720, the host computer determines if the VM is powered ON. If it is not, the host computer at step 1722 unmounts the file system and sends a request to unbind the metadata vvol to the storage system. If, on the other hand, the VM is powered ON, the method terminates.

The method for moving a vvol of a VM, currently bound to a PE, from a source storage container to a destination storage container, where both the source storage container and the destination storage container are within the scope of the same storage system manager, begins at step 1810 where the container IDs of the source and destination storage containers (SC1 and SC2, respectively) and the vvol ID of the vvol to be moved are received. Then, at step 1812, the vvol database (e.g., vvol database 314 of FIG. 3) and the extent allocation bitmap of the container database (e.g., container database 316 of FIG. 3) are updated as follows. First, the storage system manager removes the vvol extents in SC1 from SC1's entry in the container database 316, and then assigns these extents to SC2 by modifying SC2's entry in the container database 316. In one embodiment, the storage system may compensate for the loss of storage capacity (due to removal of vvol storage extents) in SC1 by assigning new spindle extents to SC1, and make up for the increase in storage capacity (due to addition of vvol storage extents) in SC2 by removing some unused spindle extents from SC2. At step 1814, the storage system manager determines whether the currently bound PE is able to optimally service IO to the vvol's new location. An example instance when the current PE is unable to service IO to the vvol's new location is if the storage administrator has statically configured the storage system manager to assign different PEs to vvols from different customers and hence different storage containers. If the current PE is unable to service IO to the vvol, the vvol, at step 1815, undergoes a rebind process (and associated changes to a connection database, e.g., the connection database 312 of FIG. 3) which is described above in conjunction with FIG. 13. After step 1815, step 1816 is carried out, where an acknowledgement of successful move completion is returned to the host computer. If, at step 1814, the storage system manager determines that the current PE is able to service IO to the new location of the vvol, step 1815 is bypassed and step 1816 is performed next.

When a vvol is moved between incompatible storage containers, e.g., between storage containers created in storage devices of different manufacturers, data movement is executed between storage containers in addition to the changes to the container database 316, the vvol database 314, and the connection database 312. In one embodiment, data movement techniques described in U.S. patent application Ser. No. 12/129,323, filed May 29, 2008 and entitled "Offloading Storage Operations to Storage Hardware," the entire contents of which are incorporated by reference herein, are employed.

Figure 19:
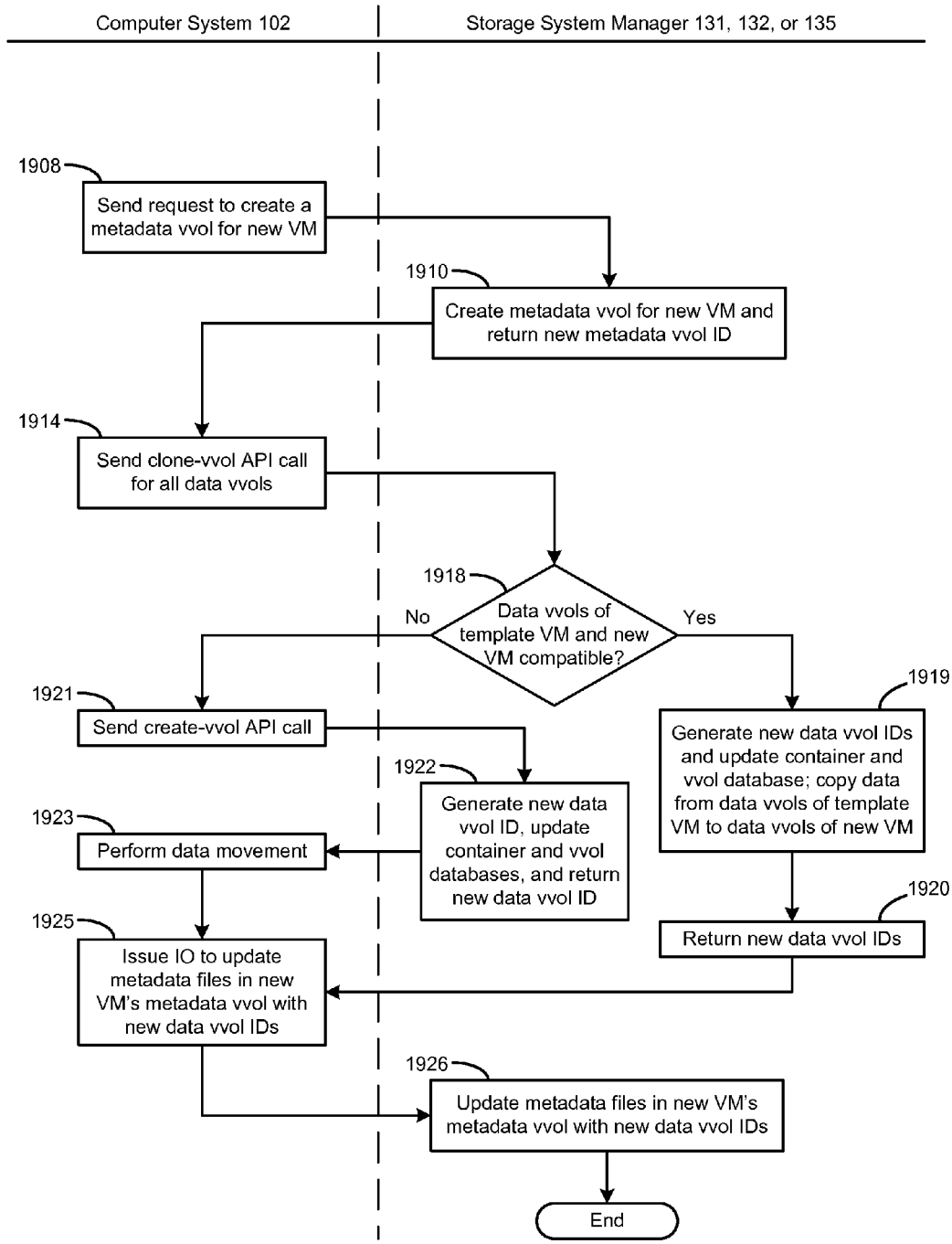
FIG. 19 is a flow diagram of method steps for cloning a VM from a template VM.

FIG. 19 is a flow diagram of method steps executed in the host computer and the storage system for cloning a VM from a template VM. This method begins at step 1908 where the host computer sends a request to create a metadata vvol for the new VM to the storage system. At 1910, the storage system creates a metadata vvol for the new VM in accordance with the method described above in conjunction with FIG. 8 and returns the new metadata vvol ID to the host computer. Then, at step 1914, a clone-vvol API call is issued from the host computer to the storage system via out-of-band path 601 for all data vvol IDs belonging to the template VM. At step 1918, the storage system manager checks to see whether or not the data vvols of the template VM and the new VM are compatible. It should be recognized that the data vvols may be not be compatible if cloning occurs between storage containers created in storage systems of different manufacturers. If there is compatibility, step 1919 is carried out. At step 1919, the storage system manager creates new data vvols by generating new data vvol IDs, updating the allocation bitmap in container database 316, and adding new vvol entries to vvol database 314, and copies content stored in data vvols of the template VM to data vvols of the new VM. At step 1920, the storage system manager returns the new data vvol IDs to the host computer. The receipt of the new data vvol IDs provides confirmation to the host computer that the data vvol cloning completed without error. Then, at step 1925, the host computer issues an IO to the metadata vvol of the new VM to update the metadata files, in particular the disk descriptor files, with newly generated data vvol IDs. The IO issued by the host computer to the storage system is executed by the storage system at step 1926, as a result of which the disk descriptor files of the new VM are updated with the newly generated data vvol IDs.

If, at step 1918, the storage system manager determines that the data vvols of the template VM and the new VM are not compatible, an error message is returned to the host computer.

Upon receipt of this error message, the host computer at step 1921 issues a create-vvol API call to the storage system to create new data vvols. At step 1922, the storage system manager creates new data vvols by generating new data vvol IDs, updating the allocation bitmap in container database 316, and adding new vvol entries to vvol database 314, and returns the new data vvol IDs to the host computer. At step 1923, the host computer executes data movement according to techniques described in U.S. patent application Ser. No. 12/356,694, filed Jan. 21, 2009 and entitled "Data Mover for Computer System," the entire contents of which are incorporated by reference herein (step 1923). After step 1923, steps 1925 and 1926 are carried out as described above.

Figure 20:
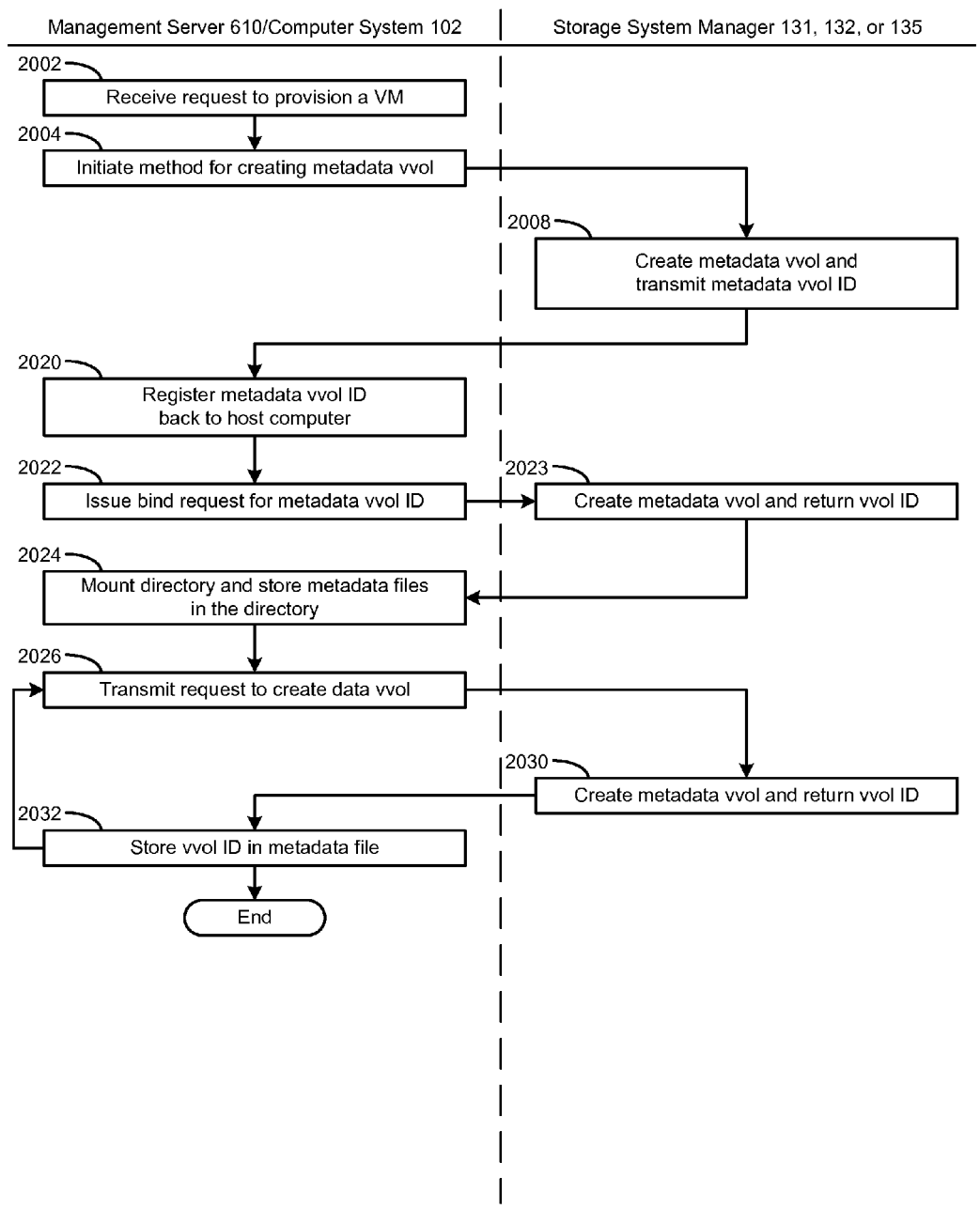
FIG. 20 is a flow diagram of method steps for provisioning a VM, according to another embodiment.

FIG. 20 is a flow diagram of method steps for provisioning a VM, according to another embodiment. In this embodiment, management server 610, a computer system hosting the VM, e.g., computer system 102 shown in FIG. 5D (hereinafter referred to as the "host computer"), and the storage system cluster of FIG. 2B, in particular storage system manager 131 or storage system manager 132 or storage system manager 135, are used. As illustrated, the request to provision the VM is received at step 2002. This may be a request generated when a VM administrator using appropriate user interfaces to management server 610 issues a command to management server 610 to provision a VM having a certain size and storage capability profiles. In response thereto, at step 2004, management server 610 initiates the method for creating a vvol to contain the VM's metadata, in particular a metadata vvol, in the manner described above in conjunction with FIG. 8, pursuant to which the storage system manager at step 2008 creates the metadata vvol, which is a file in the NAS device, and returns the metadata vvol ID to management server 610. At step 2020, management server 610 registers the vvol ID of the metadata vvol back to the host computer. At step 2022, the host computer issues a bind request for the metadata vvol ID to the storage system, in response to which the storage system at step 2023 returns an IP address and directory path as PE ID and SLLID, respectively. At step 2024, the host computer mounts the directory at the specified IP address and directory path, and stores metadata files in the mounted directory. In the embodiment using NFS, NFS client 545 or 585 may resolve the given IP address and directory path into a NFS handle in order to issue NFS requests to such directory.

At step 2026, the host computer initiates the method for creating a data vvol for each of the virtual disks of the VM in the manner described above in conjunction with FIG. 8, pursuant to which the storage system manager at step 2030 creates the data vvol and returns the vvol ID of the data vvol to the host computer. At step 2032, the host computer stores the ID of the data vvol in the disk descriptor file for the virtual disk. The method ends with the unbinding of the metadata vvol (not shown) after data vvols have been created for all of the virtual disks of the VM.

Figure 21:
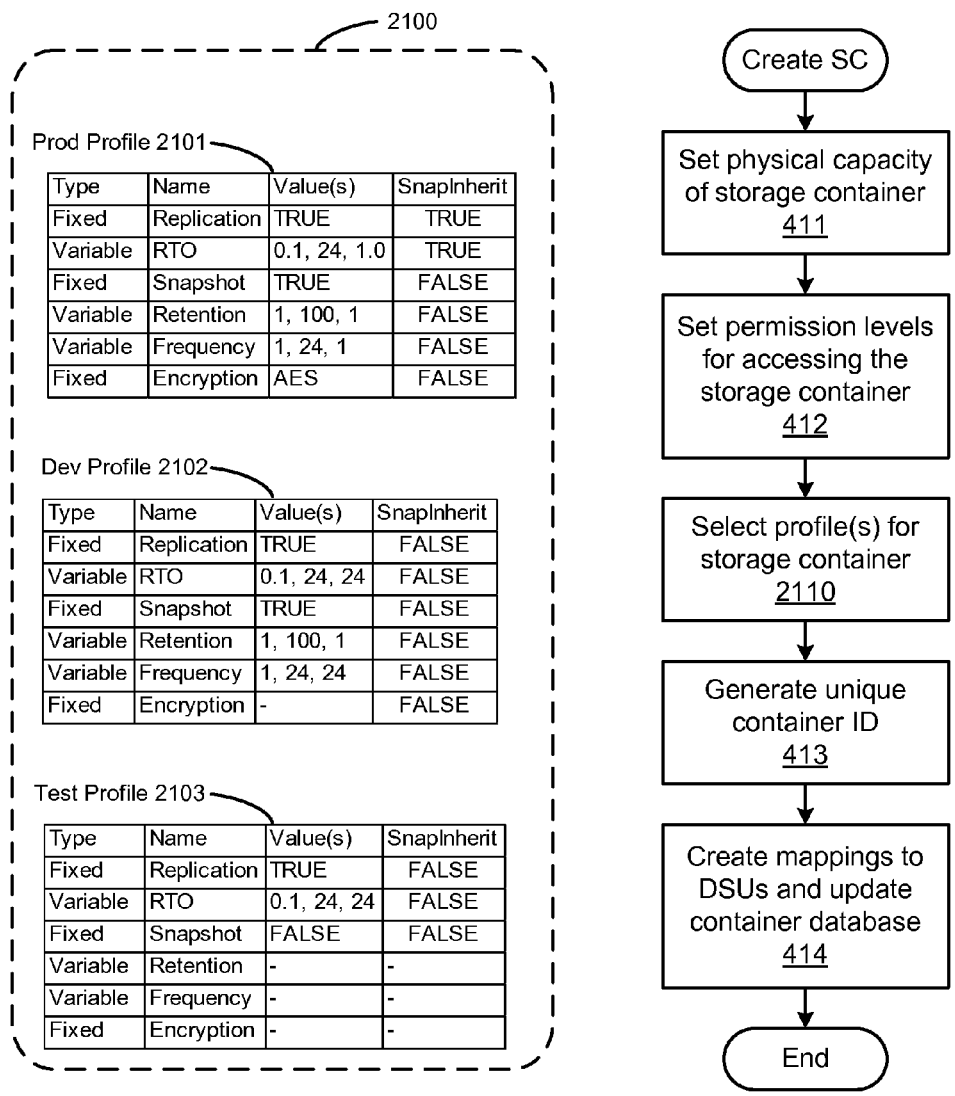
FIG. 21 illustrates sample storage capability profiles and a method for creating a storage container that includes a profile selection step.

As described above in conjunction with FIG. 8, when a new vvol is created from a storage container and a storage capability profile is not explicitly specified for the new vvol, the new vvol will inherit the storage capability profile associated with the storage container. The storage capability profile associated with the storage container may be selected from one of several different profiles. For example, as shown in FIG. 21, the different profiles include a production (prod) profile 2101, a development (dev) profile 2102, and a test profile 2103 (collectively referred to herein as "profiles 2100"). It should be recognized that many other profiles may be defined. As shown, each profile entry of a particular profile is of a fixed type or a variable type, and has a name and one or more values associated with it. A fixed type profile entry has a fixed number of selectable items. For example, the profile entry "Replication" may be set to be TRUE or FALSE. In contrast, a variable type profile entry does not have pre-defined selections. Instead, a default value and a range of values are set for a variable type profile entry, and the user may select any value that is within the range. If no value is specified, the default value is used. In the example profiles 2100 shown in FIG. 21, variable type profile entries has three numbers separated by commas. The first number is the lower end of the specified range, and the second number is the higher end of the specified range. The third number is the default value. Thus, a vvol that inherits the storage capability profile defined in production profile 2101 will be replicated (Replication.Value=TRUE), and the recovery time objective (RTO) for the replication may be defined in the range of 0.1 to 24 hours, the default being 1 hour. In addition, snapshots are allowed for this vvol (Snapshot.Value=TRUE). The number of snapshots that are retained is in the range of 1 to 100, the default being 1, and the frequency of snapshots is in the range of once per hour to once per 24 hours, the default being once per hour. The SnapInherit column indicates whether the given profile attribute (and its values) should be propagated to a derivative vvol when a given vvol is snapshotted to create a new vvol that is a derivative vvol. In the example of production profile 2101, only the first two profile entries (Replication and RTO) may be propagated to a snapshot vvol of the given vvol with production profile 2101. The values of all other attributes of the snapshot vvol will be set to the default values specified in the profile. In other words, any customizations (for example, a non-default value of snapshot frequency) of these other attribute on the given vvol will not be propagated to the snapshot vvol due to their corresponding SnapInherit column being FALSE. The profile also contains other columns such as CloneInherit (not shown), and ReplicaInherit (not shown) that control which attribute values are propagated to clones and replicas, respectively, of a given vvol.

When a storage container is created according to the method of FIG. 4, types of storage capability profiles that can be defined for vvols created from the storage container may be set. The flow diagram in FIG. 21 illustrates the method for creating a storage container shown in FIG. 4 with step 2110 inserted between steps 412 and 413. At step 2110, the storage administrator selects one or more of profiles 2100 for the storage container being created. For example, a storage container created for one customer may be associated with production profile 2101 and development profile 2102, such that a vvol that is of a production type will inherit the storage capability profile defined in production profile 2101 with default values or customer specified values, as the case may be, and a vvol that is of a development type will inherit the storage capability profile defined in development profile 2102 with default values or customer specified values, as the case may be.

Figure 22:
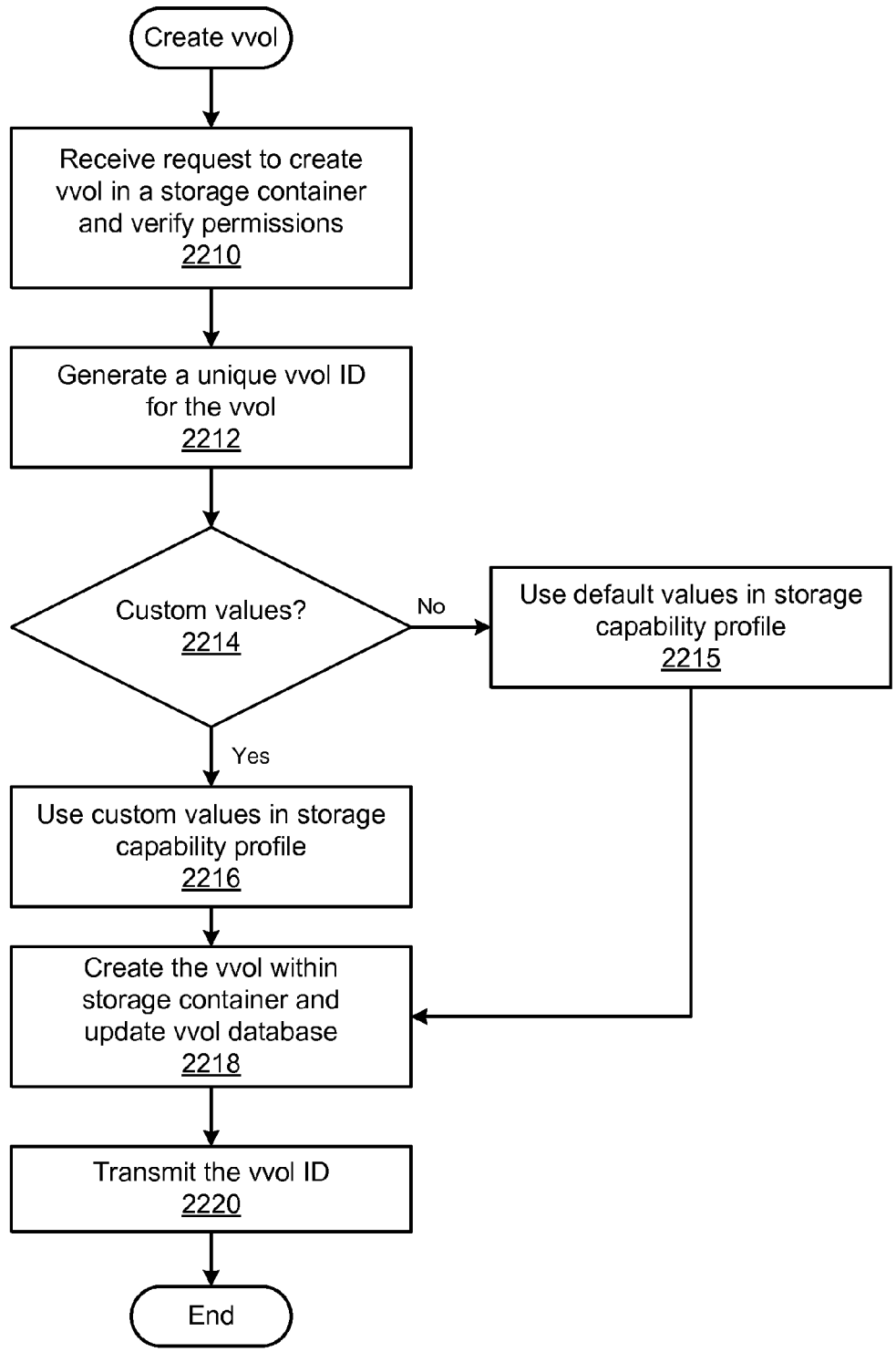
FIG. 22 is a flow diagram that illustrates method steps for creating a vvol and defining a storage capability profile for the vvol.

FIG. 22 is a flow diagram that illustrates method steps executed by storage system manager 131, 132, or 135, for creating a vvol and defining a storage capability profile for the vvol. The method steps of FIG. 22, in particular steps 2210, 2212, 2218, and 2220, correspond to steps 806, 810, 812, and 814 shown in FIG. 8, respectively. In addition, the method steps of FIG. 22 include steps 2214, 2215, and 2216, which define the storage capability profile for the vvol that is being created.

At step 2214, the storage system manager determines whether values to be used in the storage capability profile have been specified in the request to create the vvol. If they are not, the storage system manager at step 2215 employs the storage capability profile associated with the vvol's storage container as the vvol's storage capability profile with default values. If the values to be used in the storage capability profile have been specified, the storage system manager at step 2216 employs the storage capability profile associated with the vvol's storage container as the vvol's storage capability profile with the specified values in lieu of the default values.

In one embodiment, the storage capability profile of a vvol is stored in vvol database 314 as key-value pairs. Once the storage capability profile of a vvol has been defined and stored in vvol database 314 as key-value pairs and as long as replication and snapshotting related attributes and values are part of this profile as shown in the example profiles of FIG. 21, the storage system is able to perform replication and snapshotting for the vvol with no further instructions issued by the host computer.

Figure 23:
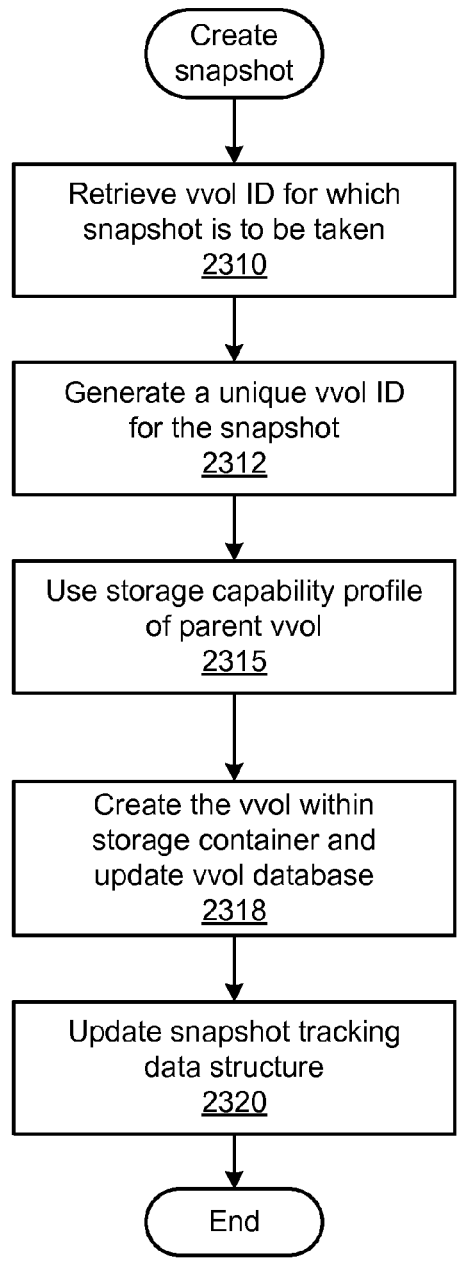
FIG. 23 is a flow diagram that illustrates method steps for creating snapshots.

FIG. 23 is a flow diagram that illustrates method steps executed by storage system manager 131, 132, or 135, for creating snapshots from a parent vvol. In one embodiment, a snapshot tracking data structure is employed to schedule snapshots according to snapshot definitions in storage capability profiles of a given vvol. Upon reaching a scheduled time for a snapshot, the storage system manager at step 2310 retrieves the vvol ID from the snapshot tracking data structure. Then, at step 2312, the storage system manager generates a unique vvol ID for the snapshot. The storage system manager at step 2315 employs the storage capability profile of the parent vvol (i.e., the vvol having the vvol ID retrieved from the snapshot tracking data structure) as the snapshot vvol's storage capability profile. It should be noted that since this is an automated profile driven snapshotting process driven by the storage system, the user does not get an opportunity to specify custom values to be used in the storage capability profile of the snapshot vvol. At step 2318, the storage system manager creates the snapshot vvol within the storage container of the parent vvol by updating the allocation bitmap in container database 316 and adding a new vvol entry for the snapshot vvol to vvol database 314. Then, at step 2320, the storage system manager updates the snapshot tracking data structure by scheduling a time for generating the next snapshot for the parent vvol. It should be recognized that the storage system manager must concurrently maintain snapshot tracking data structures and execute the method steps of FIG. 23 for all vvols whose storage capability profile mandates scheduled snapshots.

After snapshots are created in the manner described above, key-value pairs stored in vvol database 314 are updated to indicate that the snapshot vvols are of type=snapshot. Also, in embodiments where a generation number is maintained for the snapshots, the generation number being incremented each time a snapshot is taken or set to be equal to date+time, the generation number is stored as a key-value pair. The parent vvol ID of a snapshot vvol is also stored as a key-value pair in snapshot vvol entries. As a result, a host computer may query vvol database 314 for snapshots corresponding to a particular vvol ID. It is also possible for the host computer to issue a query to vvol database for snapshots corresponding to a particular vvol ID and a particular generation number.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. For example, SCSI is employed as the protocol for SAN devices and NFS is used as the protocol for NAS devices. Any alternative to the SCSI protocol may be used, such as Fibre Channel, and any alternative to the NFS protocol may be used, such as CIFS (Common Internet File System) protocol. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of embodiments described herein. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. In a computer system that is connected to a storage system via input-output command (IO) paths and non-IO paths, a method for provisioning a logical storage volume for an application running in the computer system, the method comprising:
   selecting by the computer system a logical storage container created in the storage system;
   issuing a request from the computer system to the storage system via a non-IO path to create the logical storage volume in the selected logical storage container; and
   storing a unique identifier for the logical storage volume received by the computer system from the storage system in response to the request and associating the unique identifier with a virtual machine running in the computer system.

2. The method of claim 1, wherein the logical storage volume stores metadata files of the virtual machine, the metadata files including a disk descriptor file for a virtual disk of the virtual machine.

3. The method of claim 2, wherein the logical storage volume stores data files of the virtual disk and has a size defined in the disk descriptor file for the virtual disk.

4. The method of claim 3, further comprising:
   issuing a request to the storage system to increase the size of the virtual disk; and
   updating the disk descriptor file for the virtual disk to indicate the increased size.

5. The method of claim 1, further comprising:
   issuing a request to the storage system to clone the logical storage volume between same or different logical storage containers.

6. The method of claim 5, further comprising:
   determining that the logical storage containers are not compatible; and
   issuing data movement commands from the computer system to copy contents of the logical storage volume to the cloned logical storage volume.

7. The method of claim 1, further comprising:
   issuing a request to the storage system to move the logical storage volume between logical storage containers in the storage system.

8. The method of claim 7, further comprising:
   determining that an IO path from the computer system to the storage system would be broken as a result of the move; and
   issuing a request to establish a new IO path from the computer system to the storage system after the move is completed.

9. The method of claim 1, further comprising:
   determining that the logical storage container has sufficient space to accommodate the logical storage volume.

10. The method of claim 1, further comprising:
    transmitting authentication credentials and a decryption key to the storage system,
    wherein, upon authentication of the computer system by the storage system, the request to create the logical storage volume is issued to the storage system in an encrypted form that can be decrypted using the decryption key.

11. The method of claim 1, wherein the storage system is a SCSI protocol-based storage system.

12. The method of claim 1, wherein the storage system is an NFS protocol-based storage system.

13. In a computer system that is connected to a storage system via input-output command (IO) paths and non-IO paths, a method for reprovisioning a logical storage volume for virtual machine running in the computer system, the method comprising:
    issuing a request from the computer system to the storage system via a non-IO path to increase a size of the logical storage volume provisioned in the selected logical storage container;
    receiving acknowledgement of the increase in size by the computer system from the storage system; and
    updating a metadata file associated with the logical storage volume to indicate the increased size.

14. The method of claim 13, further comprising:
    determining that the logical storage container has sufficient space to accommodate the increased size of the logical storage volume.

15. The method of claim 13, wherein the application is a virtual machine and the updated metadata file is a disk descriptor file for a virtual disk of the virtual machine.

16. The method of claim 15, wherein the metadata file is stored in another logical storage volume that has been provisioned for the virtual machine.

17. A computer system connected to a storage system via input-output command (IO) paths and non-IO paths, the computer system comprising:
    a management interface in a non-IO path; and
    a storage interface in an IO path,
    wherein the management interface is configured to: (i) generate a request to create a logical storage volume in the storage system and to receive in response to the request a unique identifier for the logical storage volume, and (ii) generate a request to bind the logical storage volume to a protocol endpoint configured in the storage system and to receive in response to the request first and second identifiers, and
    wherein the storage interface encodes IO issued to the logical storage volume with the first and second identifiers.

18. The computer system of claim 17, wherein the storage interface generates IOs in SCSI compliant format.

19. The computer system of claim 17, wherein the storage interface generates IOs in NFS compliant format.

20. The computer system of claim 17, wherein the management interface is configured to generate a request to rebind the logical storage volume and to receive in response to the request new first and second identifiers, the new first identifier identifying a new protocol endpoint to which the logical storage volume is bound and the new second identifier uniquely identifying the logical storage volume amongst all logical storage volumes bound to the new protocol endpoint.

* * * * *